United States Patent
Taheri et al.

(10) Patent No.: US 12,316,715 B2
(45) Date of Patent: May 27, 2025

(54) DYNAMIC PUSH NOTIFICATIONS

(71) Applicant: The Toronto-Dominion Bank, Toronto (CA)

(72) Inventors: Shahriar Taheri, Newmarket (CA); Ashkan Alavi-Harati, Markham (CA)

(73) Assignee: The Toronto-Dominion Bank, Toronto (CA)

( * ) Notice: Subject to any disclaimer, the term of this patent is extended or adjusted under 35 U.S.C. 154(b) by 56 days.

(21) Appl. No.: 18/481,973

(22) Filed: Oct. 5, 2023

(65) Prior Publication Data

US 2025/0119479 A1 Apr. 10, 2025

(51) Int. Cl.
| | |
|---|---|
| G06F 15/16 | (2006.01) |
| G06Q 30/0601 | (2023.01) |
| H04L 51/02 | (2022.01) |
| H04L 67/55 | (2022.01) |
| H04W 4/029 | (2018.01) |

(52) U.S. Cl.
CPC ......... H04L 67/55 (2022.05); G06Q 30/0631 (2013.01); H04L 51/02 (2013.01); H04W 4/029 (2018.02)

(58) Field of Classification Search
None
See application file for complete search history.

(56) References Cited

U.S. PATENT DOCUMENTS

| | | | |
|---|---|---|---|
| 8,682,784 B2 | 3/2014 | Schleicher | |
| 9,922,338 B2 | 3/2018 | Ovick et al. | |
| 9,965,768 B1 | 5/2018 | Doane et al. | |
| 9,990,646 B2 | 6/2018 | Salmon et al. | |
| 10,068,226 B2 | 9/2018 | Chandrasekaran | |
| 10,157,400 B1 | 12/2018 | Georgi | |
| 10,296,908 B2 | 5/2019 | Narayanan et al. | |
| 10,339,931 B2 | 7/2019 | Tseretopoulos et al. | |
| 10,360,303 B2 | 7/2019 | Volkovs et al. | |
| 10,366,387 B2 | 7/2019 | Aabye et al. | |
| 10,460,748 B2 | 10/2019 | Tseretopoulos et al. | |
| 10,482,675 B1 | 11/2019 | Sutter et al. | |
| 10,628,843 B2 | 4/2020 | Bell et al. | |
| 10,650,398 B2 | 5/2020 | Kim et al. | |
| 10,659,400 B2 | 5/2020 | Moon et al. | |
| 10,706,635 B2 | 7/2020 | Sutter et al. | |
| 10,728,259 B2 | 7/2020 | McCarter et al. | |
| 10,733,623 B2 | 8/2020 | Ovick et al. | |
| 10,740,736 B2 | 8/2020 | Bhatt et al. | |
| 10,776,619 B2 | 9/2020 | Collinson et al. | |
| 10,795,940 B2 | 10/2020 | Choi et al. | |
| 10,810,574 B1 | 10/2020 | Wilson et al. | |
| 10,824,941 B2 | 11/2020 | Volkovs et al. | |

(Continued)

*Primary Examiner* — Wing F Chan
*Assistant Examiner* — Andrew Woo

(57) ABSTRACT

An example operation may include one or more of storing a database of payment card data, receiving an identifier of a product from a digital wallet on a user device, identifying one or more payment cards stored within the digital wallet on the user device, determining the benefits that will be obtained by using each of the one or more payment cards to purchase the product via execution of an LLM on the identifier of the product and the database of payment card data; and displaying a chat message within a chat window on the user device with a description of the determined benefits that will be obtained.

17 Claims, 13 Drawing Sheets

(56) References Cited

U.S. PATENT DOCUMENTS

| | | | |
|---|---|---|---|
| 10,878,816 B2 | 12/2020 | Tseretopoulos et al. |
| 10,902,220 B2 | 1/2021 | Lozon et al. |
| 10,922,665 B2 | 2/2021 | Miller et al. |
| 10,943,605 B2 | 3/2021 | Tseretopoulos et al. |
| 10,977,623 B2 | 4/2021 | Delaney |
| 11,004,187 B2 | 5/2021 | Kuruvilla et al. |
| 11,017,028 B2 | 5/2021 | Dunjic et al. |
| 11,030,412 B2 | 6/2021 | Shanmugam et al. |
| 11,030,415 B2 | 6/2021 | Volkovs et al. |
| 11,061,638 B2 | 7/2021 | Lam |
| 11,070,448 B2 | 7/2021 | Miller et al. |
| 11,087,314 B2 | 8/2021 | Gandhi et al. |
| 11,100,168 B2 | 8/2021 | Miller et al. |
| 11,144,921 B2 | 10/2021 | Dunjic et al. |
| 11,144,998 B2 | 10/2021 | Kuruvilla et al. |
| 11,151,547 B2 | 10/2021 | Jamkhedkar et al. |
| 11,159,457 B2 | 10/2021 | Liang et al. |
| 11,170,161 B2 | 11/2021 | Goyal et al. |
| 11,182,860 B2 | 11/2021 | Kuruvilla et al. |
| 11,190,464 B2 | 11/2021 | Akkiraju et al. |
| 11,200,328 B2 | 12/2021 | Shpurov et al. |
| 11,200,411 B2 | 12/2021 | Rizvi et al. |
| 11,200,506 B2 | 12/2021 | Wu et al. |
| 11,206,227 B2 | 12/2021 | Akkiraju et al. |
| 11,222,286 B2 | 1/2022 | Choe et al. |
| 11,276,257 B2 | 3/2022 | Moghtadai et al. |
| 11,295,727 B2 | 4/2022 | Mei et al. |
| 11,334,574 B2 | 5/2022 | Caputo et al. |
| 11,334,864 B2 | 5/2022 | Bloys et al. |
| 11,354,442 B2 | 6/2022 | Haldenby et al. |
| 11,354,650 B2 | 6/2022 | Kurylko et al. |
| 11,354,697 B2 * | 6/2022 | Givol ............... G06Q 30/0609 |
| 11,361,566 B2 | 6/2022 | Collinson et al. |
| 11,373,229 B2 | 6/2022 | Tseretopoulos et al. |
| 11,392,647 B2 | 7/2022 | Asthana et al. |
| 11,392,776 B2 | 7/2022 | Lozon et al. |
| 11,393,020 B2 | 7/2022 | Mathew et al. |
| 11,394,668 B1 | 7/2022 | Subbunarayanan et al. |
| 11,397,765 B2 | 7/2022 | Volkovs et al. |
| 11,409,811 B2 | 8/2022 | D'Agostino |
| 11,411,734 B2 | 8/2022 | Shpurov et al. |
| 11,451,496 B1 | 9/2022 | Zhang et al. |
| 11,469,878 B2 | 10/2022 | Shpurov et al. |
| 11,470,091 B2 | 10/2022 | McCarter et al. |
| 11,475,059 B2 | 10/2022 | Liu et al. |
| 11,475,251 B2 | 10/2022 | Morin et al. |
| 11,477,265 B2 | 10/2022 | McPhee et al. |
| 11,507,622 B2 | 11/2022 | Grebenisan et al. |
| 11,507,868 B2 | 11/2022 | Kwong et al. |
| 11,580,762 B2 | 2/2023 | Rizvi et al. |
| 11,604,899 B2 | 3/2023 | Haldenby et al. |
| 11,620,741 B2 | 4/2023 | Kuruvilla et al. |
| 11,632,311 B2 | 4/2023 | Miller et al. |
| 11,663,488 B2 | 5/2023 | Volkovs et al. |
| 11,687,995 B2 | 6/2023 | Tseretopoulos et al. |
| 11,689,484 B2 | 6/2023 | Moon et al. |
| 11,699,431 B2 | 7/2023 | Shepal |
| 11,704,782 B2 | 7/2023 | Wakim et al. |
| 11,710,479 B1 | 7/2023 | Shenoy et al. |
| 11,741,305 B2 | 8/2023 | Skaljin et al. |
| 11,743,210 B2 | 8/2023 | Moon et al. |
| 11,748,400 B2 | 9/2023 | Volkovs et al. |
| 11,782,935 B2 | 10/2023 | Caputo et al. |
| 11,789,909 B2 | 10/2023 | Grebenisan et al. |
| 11,790,012 B2 | 10/2023 | D'Agostino |
| 11,790,354 B2 | 10/2023 | Gandhi et al. |
| 11,809,486 B2 | 11/2023 | Liu et al. |
| 11,809,577 B2 | 11/2023 | Begg et al. |
| 11,842,252 B2 | 12/2023 | Kuang et al. |
| 11,886,764 B2 | 1/2024 | Lam |
| 11,928,112 B2 | 3/2024 | Dunjic et al. |
| 11,941,525 B2 | 3/2024 | Morin et al. |
| 11,966,491 B2 | 4/2024 | D'Agostino |
| 11,978,085 B2 | 5/2024 | Rai et al. |
| 11,978,090 B2 | 5/2024 | Navarro et al. |
| 11,995,121 B2 | 5/2024 | Volkovs et al. |
| 12,008,315 B2 | 6/2024 | Miller et al. |
| 12,021,874 B2 | 6/2024 | Dunjic et al. |
| 12,039,535 B2 | 7/2024 | Dunjic et al. |
| 12,052,363 B2 | 7/2024 | Shpurov et al. |
| 12,061,652 B2 | 8/2024 | Miller et al. |
| 12,067,130 B2 | 8/2024 | Shpurov et al. |
| 12,067,580 B2 | 8/2024 | Jeske et al. |
| 12,079,351 B2 | 9/2024 | Begg et al. |
| 12,106,220 B2 | 10/2024 | Volkovs et al. |
| 12,111,793 B2 | 10/2024 | Grebenisan et al. |
| 12,124,925 B2 | 10/2024 | Rho et al. |
| 12,136,079 B2 | 11/2024 | Jones et al. |
| 2005/0045728 A1 | 3/2005 | Kargman |
| 2011/0060631 A1 | 3/2011 | Grossman et al. |
| 2011/0060634 A1 | 3/2011 | Grossman et al. |
| 2014/0122618 A1 | 5/2014 | Duan |
| 2018/0268818 A1 | 9/2018 | Schoenmackers et al. |
| 2018/0278552 A1 | 9/2018 | Quock et al. |
| 2019/0197527 A1 | 6/2019 | Agarwalla et al. |
| 2020/0058068 A1 | 2/2020 | Gandhi et al. |
| 2020/0387550 A1 | 12/2020 | Cappetta et al. |
| 2021/0027160 A1 | 1/2021 | Volkovs et al. |
| 2021/0035239 A1 | 2/2021 | Srivastava et al. |
| 2021/0037040 A1 | 2/2021 | Aleks et al. |
| 2021/0117893 A1 | 4/2021 | Sohum et al. |
| 2021/0192496 A1 | 6/2021 | Gregovic |
| 2021/0232950 A1 | 7/2021 | Kono |
| 2021/0264461 A1 | 8/2021 | Fam |
| 2021/0365482 A1 | 11/2021 | Kim |
| 2021/0407016 A1 | 12/2021 | Kuruvilla et al. |
| 2022/0051228 A1 | 2/2022 | Guo et al. |
| 2022/0058489 A1 | 2/2022 | Volkovs et al. |
| 2022/0058512 A1 | 2/2022 | Noorizadeh et al. |
| 2022/0075605 A1 | 3/2022 | Iyer et al. |
| 2022/0076666 A1 | 3/2022 | Trehan |
| 2022/0108069 A1 | 4/2022 | Lee |
| 2022/0157094 A1 | 5/2022 | Moghtadai et al. |
| 2022/0172083 A1 | 6/2022 | Wu et al. |
| 2022/0188697 A1 | 6/2022 | Seth |
| 2022/0188705 A1 | 6/2022 | Davoodi et al. |
| 2022/0198411 A1 | 6/2022 | Jones et al. |
| 2022/0198445 A1 | 6/2022 | Jones et al. |
| 2022/0207295 A1 | 6/2022 | Stanevich et al. |
| 2022/0207430 A1 | 6/2022 | Dickie et al. |
| 2022/0207432 A1 | 6/2022 | Whelan et al. |
| 2022/0207606 A1 | 6/2022 | Dickie et al. |
| 2022/0270155 A1 | 8/2022 | Volkovs et al. |
| 2022/0277213 A1 | 9/2022 | Braviner et al. |
| 2022/0277227 A1 | 9/2022 | Yu et al. |
| 2022/0277323 A1 | 9/2022 | Whelan et al. |
| 2022/0300903 A1 | 9/2022 | Huang et al. |
| 2022/0300998 A1 | 9/2022 | Glazier et al. |
| 2022/0309250 A1 | 9/2022 | Das et al. |
| 2022/0309573 A1 | 9/2022 | Mathew et al. |
| 2022/0318573 A1 | 10/2022 | Smith et al. |
| 2022/0318617 A1 | 10/2022 | Wong et al. |
| 2022/0327397 A1 | 10/2022 | Braviner et al. |
| 2022/0327430 A1 | 10/2022 | Zuberi et al. |
| 2022/0327431 A1 | 10/2022 | Braviner et al. |
| 2022/0327432 A1 | 10/2022 | Gutierrez Bugarin et al. |
| 2022/0327625 A1 | 10/2022 | Leung et al. |
| 2022/0335223 A1 | 10/2022 | Tripathi et al. |
| 2022/0335468 A1 | 10/2022 | Sherif et al. |
| 2022/0335718 A1 | 10/2022 | Ma et al. |
| 2022/0343422 A1 | 10/2022 | Zuberi et al. |
| 2022/0383313 A1 | 12/2022 | Jones et al. |
| 2022/0414495 A1 | 12/2022 | Stanevich et al. |
| 2023/0006809 A1 | 1/2023 | Shpurov et al. |
| 2023/0007075 A1 | 1/2023 | McPhee et al. |
| 2023/0011451 A1 | 1/2023 | Lu |
| 2023/0033328 A1 | 2/2023 | Pal |
| 2023/0048437 A1 | 2/2023 | Karbasi et al. |
| 2023/0083899 A1 | 3/2023 | Gandouet et al. |
| 2023/0085061 A1 | 3/2023 | Ma et al. |
| 2023/0086653 A1 | 3/2023 | Zykh et al. |
| 2023/0107703 A1 | 4/2023 | Zhang et al. |
| 2023/0113752 A1 | 4/2023 | Jorlett et al. |
| 2023/0119108 A1 | 4/2023 | Volkovs et al. |

(56) References Cited

U.S. PATENT DOCUMENTS

| | | |
|---|---|---|
| 2023/0131935 A1 | 4/2023 | Volkovs et al. |
| 2023/0133373 A1 | 5/2023 | McGonnell et al. |
| 2023/0153461 A1 | 5/2023 | Kalra et al. |
| 2023/0188480 A1 | 6/2023 | Menon et al. |
| 2023/0195734 A1 | 6/2023 | Cashion et al. |
| 2023/0196406 A1 | 6/2023 | Gandouet et al. |
| 2023/0244917 A1 | 8/2023 | Loaiza Ganem et al. |
| 2023/0244962 A1 | 8/2023 | Volkovs et al. |
| 2023/0245234 A1 | 8/2023 | Sumant |
| 2023/0252301 A1 | 8/2023 | Volkovs et al. |
| 2023/0259883 A1 | 8/2023 | Misler et al. |
| 2023/0267367 A1 | 8/2023 | Volkovs et al. |
| 2023/0267475 A1 | 8/2023 | Navarro et al. |
| 2023/0274086 A1 | 8/2023 | Tunstall-Pedoe et al. |
| 2023/0274094 A1 | 8/2023 | Tunstall-Pedoe et al. |
| 2023/0318994 A1 | 10/2023 | Moon et al. |
| 2023/0351116 A1 | 11/2023 | Skaljin et al. |
| 2023/0368048 A1 | 11/2023 | Yang et al. |
| 2023/0377047 A1 | 11/2023 | Bouëtté et al. |
| 2023/0385693 A1 | 11/2023 | Cresswell et al. |
| 2023/0385694 A1 | 11/2023 | Cresswell et al. |
| 2023/0386190 A1 | 11/2023 | Cresswell et al. |
| 2023/0401192 A1 | 12/2023 | Yang et al. |
| 2023/0401553 A1 | 12/2023 | Navarro et al. |
| 2023/0419302 A1 | 12/2023 | Navarro et al. |
| 2023/0419402 A1 | 12/2023 | Ghelichi et al. |
| 2024/0020534 A1 | 1/2024 | Perez Vallejo et al. |
| 2024/0062117 A1 | 2/2024 | Kuang et al. |
| 2024/0106851 A1 | 3/2024 | Kennedy et al. |
| 2024/0119346 A1 | 4/2024 | Chang et al. |
| 2024/0127036 A1 | 4/2024 | Zuberi et al. |
| 2024/0127214 A1 | 4/2024 | Wander et al. |
| 2024/0161184 A1 | 5/2024 | Heglin et al. |
| 2024/0193562 A1 | 6/2024 | Pratten et al. |
| 2024/0202756 A1 | 6/2024 | Karl et al. |
| 2024/0211732 A1 | 6/2024 | Wander et al. |
| 2024/0212049 A1 | 6/2024 | Ghelichi et al. |
| 2024/0220653 A1 | 7/2024 | D'Agostino |
| 2024/0232614 A1 | 7/2024 | Esmaeili et al. |
| 2024/0232950 A1 | 7/2024 | Navarro et al. |
| 2024/0256903 A1 | 8/2024 | Ens et al. |
| 2024/0256904 A1 | 8/2024 | Leung et al. |
| 2024/0256968 A1 | 8/2024 | Hosseinzadeh et al. |
| 2024/0281467 A1 | 8/2024 | Volkovs et al. |
| 2024/0281808 A1 | 8/2024 | Vouitsis et al. |
| 2024/0281818 A1 | 8/2024 | Golestan Irani et al. |
| 2024/0289645 A1 | 8/2024 | Makhijani et al. |
| 2024/0289876 A1 | 8/2024 | Mathew et al. |
| 2024/0303551 A1 | 9/2024 | Li et al. |
| 2024/0304182 A1 | 9/2024 | Hamilton et al. |
| 2024/0330772 A1 | 10/2024 | Cresswell et al. |
| 2024/0338520 A1 | 10/2024 | Misler et al. |
| 2024/0346338 A1 | 10/2024 | Desai et al. |
| 2024/0370880 A1 | 11/2024 | Jeske et al. |
| 2024/0370881 A1 | 11/2024 | Jeske et al. |

\* cited by examiner

FIG. 1
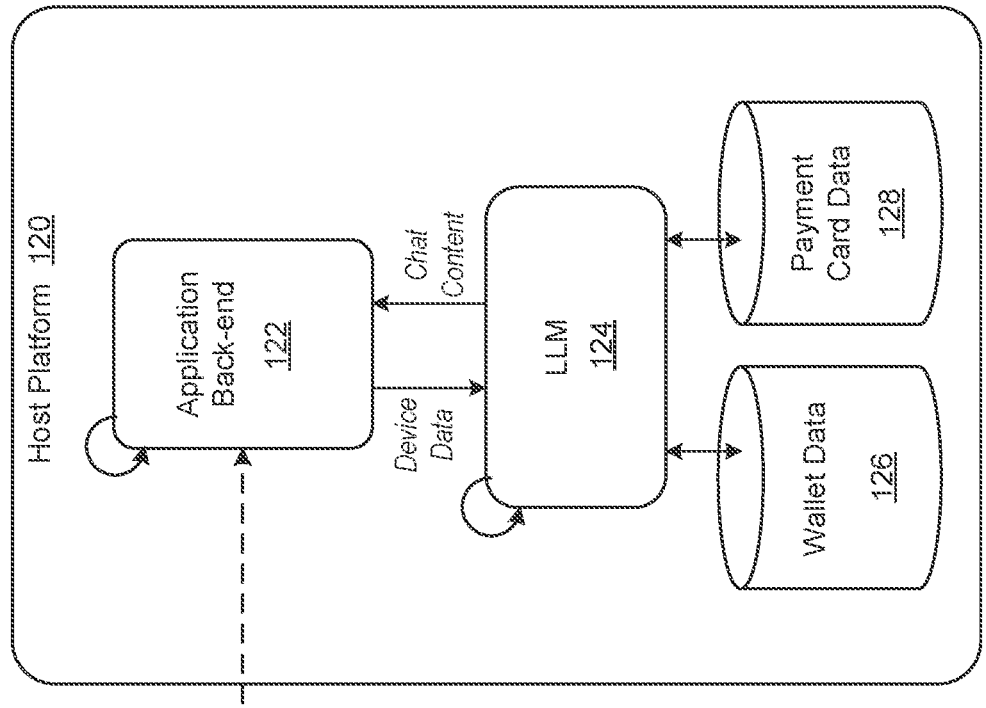
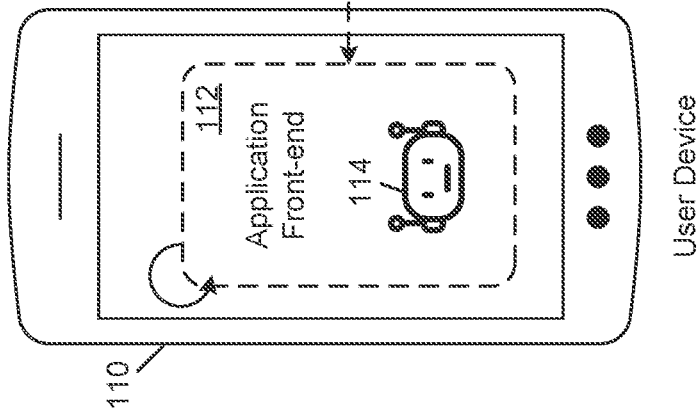

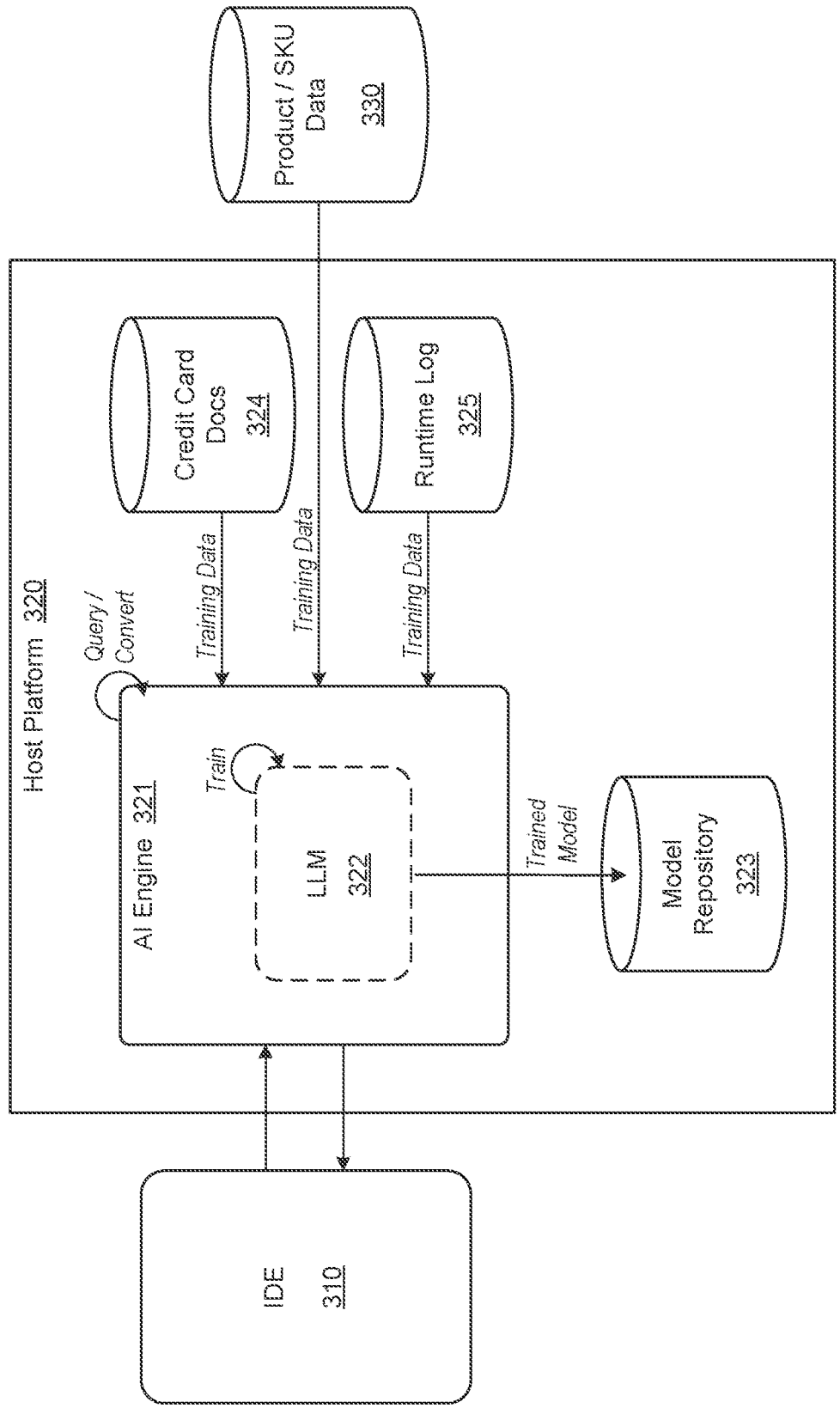

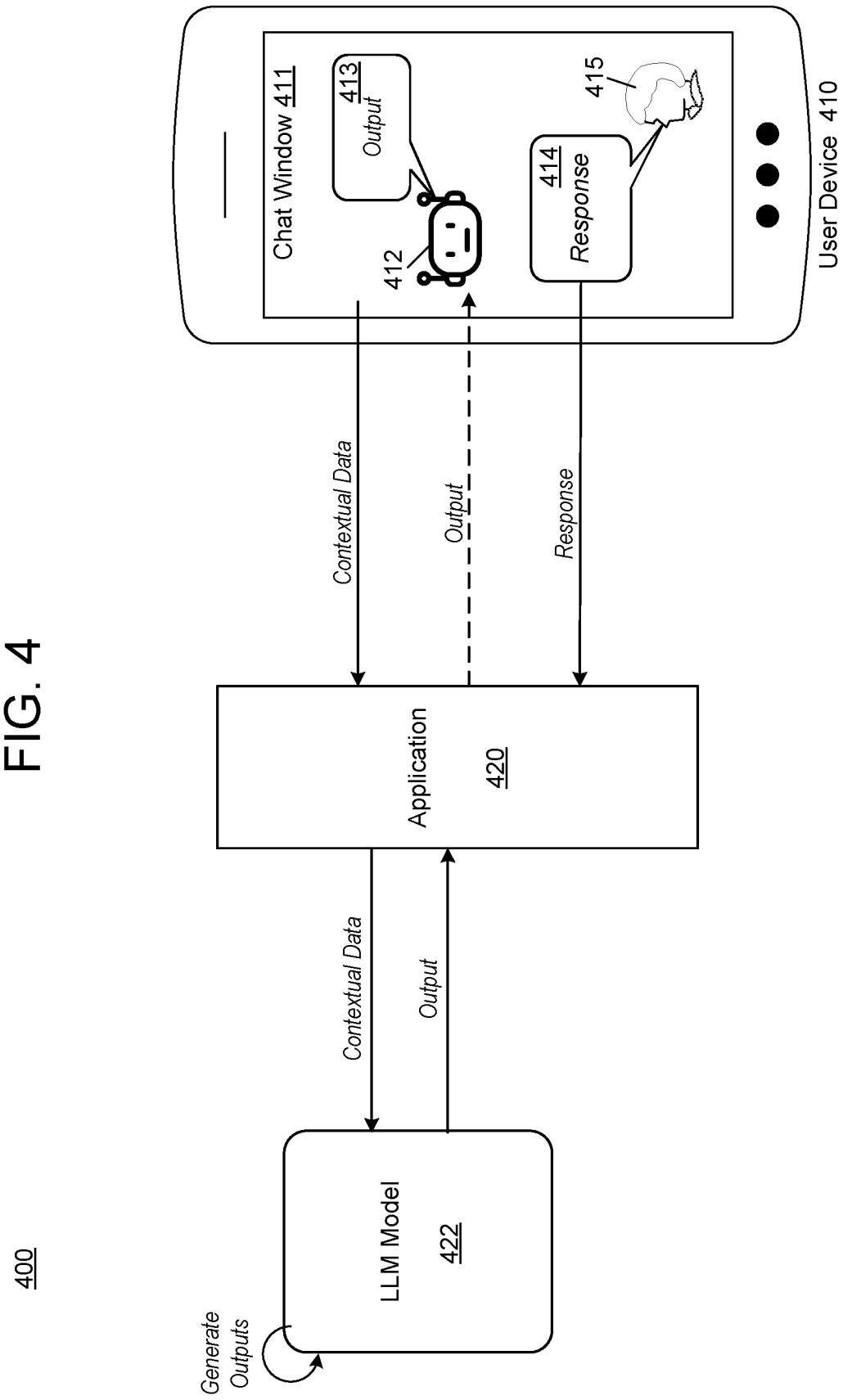

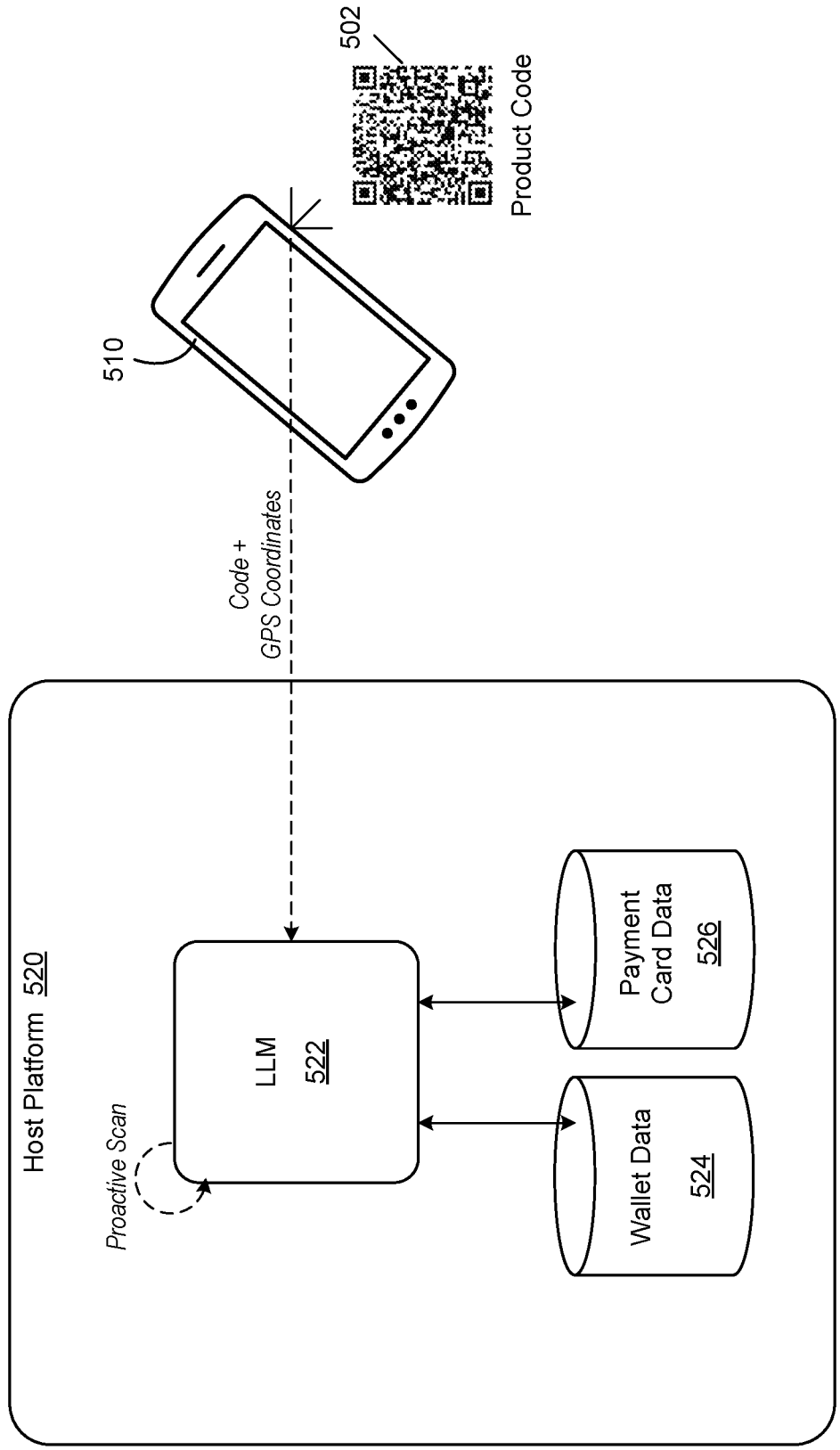

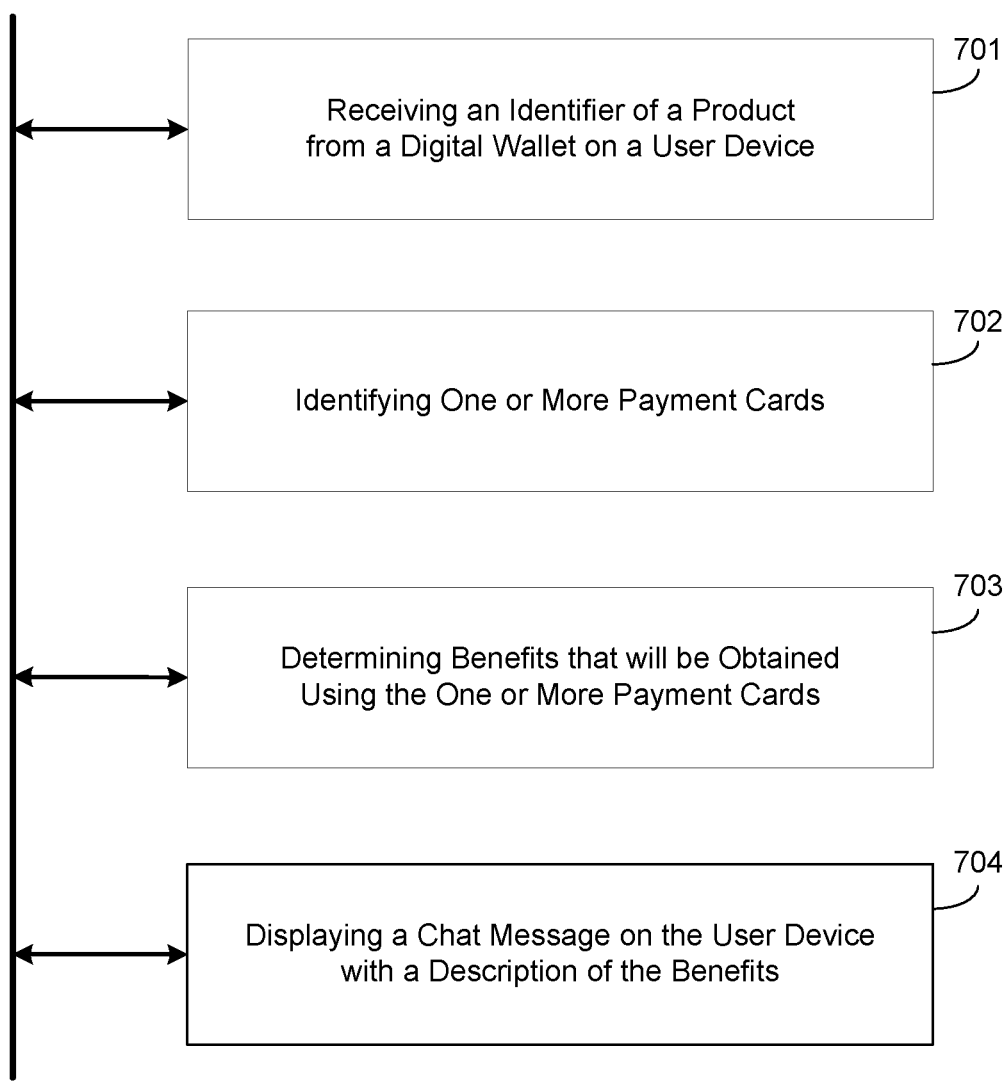

800 FIG. 8
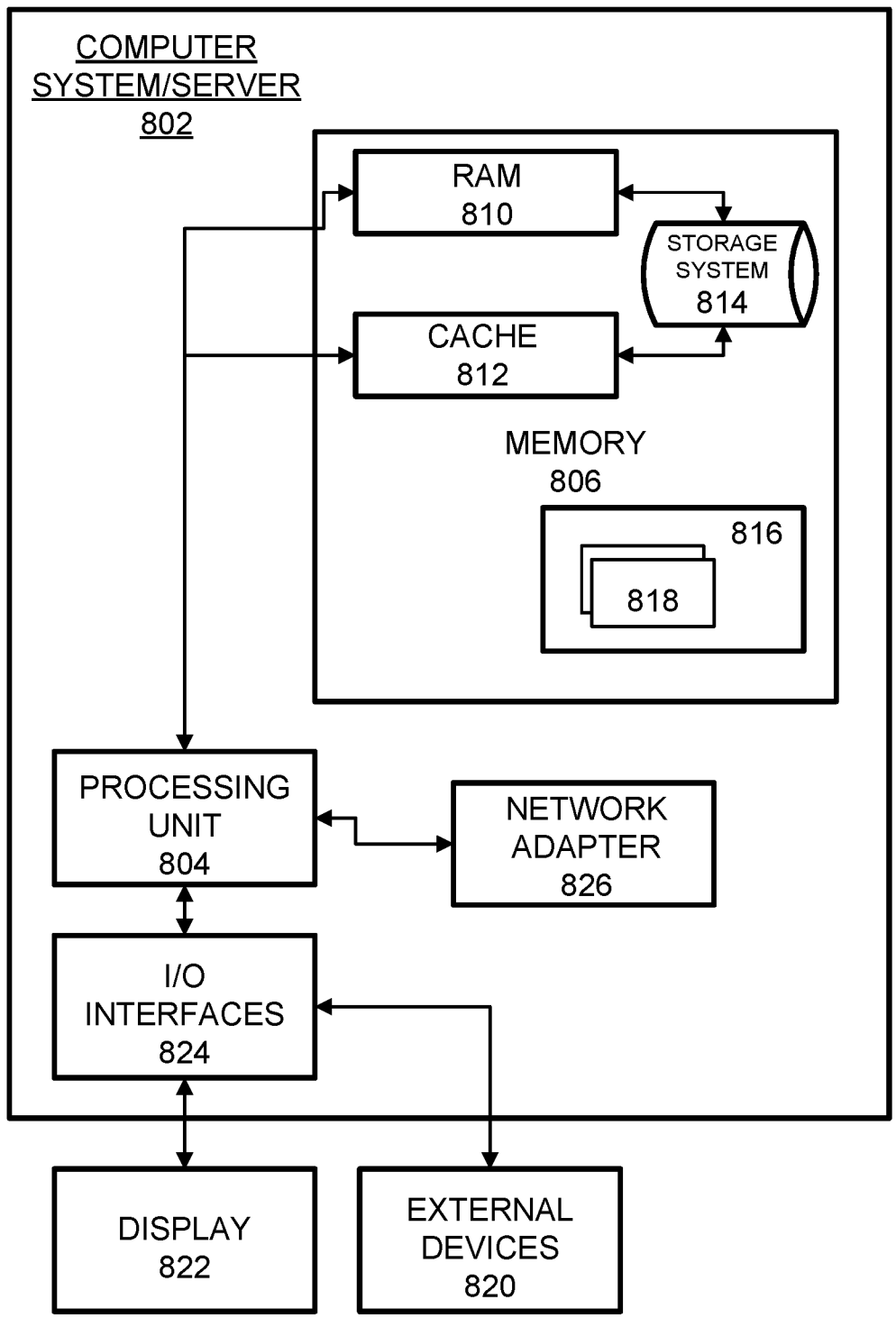

DYNAMIC PUSH NOTIFICATIONS

BACKGROUND

Many consumers rely on payment cards such as credit cards, debit cards, gift cards, and other payment cards when making daily purchases. In many cases, the payment cards provide the cardholder with benefits such as travel insurance, cash back, points towards rewards, and the like. In some cases, a credit card company (or other financial institutions) may partner with a particular merchant that results in benefits to both the merchant and the cardholders of the credit card companies. However, rarely does a cardholder understand all the benefits that are available to them through the different payment cards in their wallet, nor which merchants provide benefits that are specific to one card over another card.

SUMMARY

One example embodiment provides an apparatus that may include a memory configured to store a database of payment card data, and a processor configured to receive a geographic location of a user device from a sensor of the user device, identify one or more objects at the geographic location of the user device, determine benefits that will be obtained by purchasing each of the one or more objects via execution of a large language model (LLM) on identifiers of the one or more objects and the database of payment card data, and push a chat message within a chat window on the user device with a description of the determined benefits that will be obtained.

Another example embodiment provides a method that includes one or more of storing a database of payment card data, receiving an identifier of a product from a digital wallet on a user device, identifying one or more payment cards stored within the digital wallet on the user device, determining the benefits that will be obtained by using each of the one or more payment cards to purchase the product via execution of an LLM on the identifier of the product and the database of payment card data, and displaying a chat message within a chat window on the user device with a description of the determined benefits that will be obtained.

A further example embodiment provides a computer-readable medium comprising instructions, that when read by a processor, cause the processor to perform one or more of storing a database of payment card data, receiving an identifier of a product from a digital wallet on a user device, identifying one or more payment cards stored within the digital wallet on the user device, determining the benefits that will be obtained by using each of the one or more payment cards to purchase the product via execution of an LLM on the identifier of the product and the database of payment card data, and displaying a chat message within a chat window on the user device with a description of the determined benefits that will be obtained.

A further example embodiment provides an apparatus that may include a memory and a processor coupled to the memory, the processor configured to receive an identifier of a product from a digital wallet on a user device, identify one or more payment cards stored within the digital wallet on the user device, determine benefits that will be obtained by using each of the one or more payment cards to purchase the product via execution of an LLM on the identifier of the product and a corpus of credit card documents, and display a chat message within a chat window on the user device with a description of the determined benefits that will be obtained.

A further example embodiment provides a method that includes one or more of receiving an identifier of a product from a digital wallet on a user device, identifying one or more payment cards stored within the digital wallet on the user device, determining benefits that will be obtained by using each of the one or more payment cards to purchase the product via execution of an LLM on the identifier of the product and a corpus of credit card documents, and displaying a chat message within a chat window on the user device with a description of the determined benefits that will be obtained.

A further example embodiment provides a computer-readable medium comprising instructions, that when read by a processor, cause the processor to perform one or more of receiving an identifier of a product from a digital wallet on a user device, identifying one or more payment cards stored within the digital wallet on the user device, determining benefits that will be obtained by using each of the one or more payment cards to purchase the product via execution of an LLM on the identifier of the product and a corpus of credit card documents, and displaying a chat message within a chat window on the user device with a description of the determined benefits that will be obtained.

BRIEF DESCRIPTION OF THE DRAWINGS

FIG. 1 is a diagram illustrating a computing environment for a chatbot that discusses payment card data according to example embodiments.

FIGS. 3A-3C are diagrams illustrating processes for training a machine learning model according to example embodiments.

FIG. 4 is a diagram illustrating a process of generating a chat response based on contextual data and product data according to example embodiments.

FIGS. 5A-5B are diagrams illustrating a process of a chatbot performing a proactive benefit scan based on contextual data according to example embodiments.

FIG. 7A is a diagram illustrating a method of executing a proactive benefit scan through a chatbot according to example embodiments.

FIG. 8 is a diagram illustrating a computing system that may be used in any of the example embodiments described herein.

DETAILED DESCRIPTION

Figure 2:
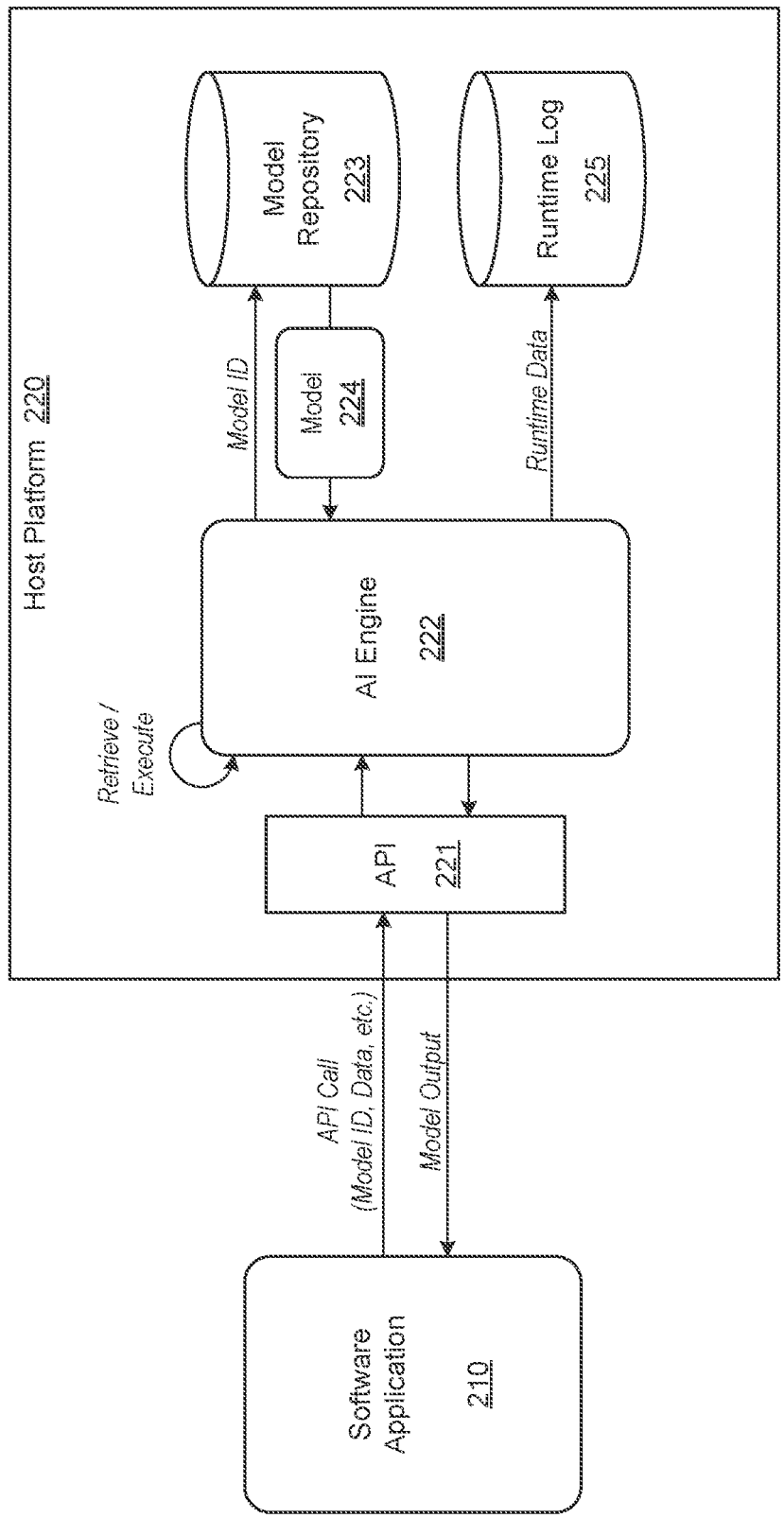
FIG. 2 is a diagram illustrating a process of executing a machine-learning model on input content according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed. Although described in a particular manner, by example only, or more feature(s), element(s), and step(s) described herein may be utilized together, and in various combinations, without exclusively, unless expressly indicated otherwise herein.

The example embodiments are directed to a platform that hosts a chatbot configured to converse with users about payment cards including payment cards that are stored in their digital wallet. The chatbot may be referred to herein as a generative pre-trained transformer (GPT), also known as Chat GPT. Generative pre-trained transformers include neural network models that use a transformer architecture. As another example, a Chat GPT model may include a large language model (LLM). The transformer architecture may include an encoder-decoder neural network with a feed-forward network and masking properties.

The Chat GPT model described herein may be embodied within a mobile application, such as a mobile payment application, digital wallet, etc. The chatbot may be based on an artificial intelligence system that uses the GPT model to learn a correlation between benefits offered by payment cards and products available for purchase. The GPT model can ingest payment card documentation, manuals, standards, user guides, frequently asked questions (FAQs) pages, and the like. The GPT model can ingest input from the user such as natural language input submitted through a chat window. The GPT model can also ingest content from various products and learn mappings between content (e.g., a description of benefits, etc.) in the credit card documentation and a product offered by a merchant.

For example, a user may open the chatbot on their device by opening their mobile wallet, including a chat window.

Here, the user may input questions/queries the chat will answer. For example, the user may ask the chatbot questions about a product of interest. The chatbot may describe the benefits the user will obtain if they purchase the product using their payment cards. In some embodiments, the GPT model may match a query about a product to a piece of content within a document stored in a database, extract the content from the document, and display the content on the chat window.

As another example, the GPT model may receive contextual data about the user, such as a geographic location of the user, a scanned product code, calendar data, and the like. With this information, the GPT model can determine that the user will consider purchasing something in the future, such as a consumer device, an airplane ticket, a rental car, etc. Here, the future may only be a few seconds, but it is enough time for the GPT model to give the user an idea of the benefits that will be obtained from purchasing the product using the cards that currently exist in the user's wallet/digital wallet.

For example, the GPT model can ingest the contextual data, credit card documents, merchant data, product data sold by the merchants, etc. Furthermore, the GPT model can identify a benefit described within the credit card documents that match the product to be purchased and may display a description of the benefit via the chatbot within the chat window of the user's device. As such, the user may know the best card to use in their wallet when purchasing.

According to various embodiments, the GPT model may be a generative artificial intelligence (GenAI) model, such as a multimodal large language model (LLM). The GPT model will be referred to herein as an LLM for further reference. The LLM can understand connections between products and payment card benefits written within payment card documents.

For example, the LLM may include libraries and deep learning frameworks that enable the LLM to create content, such as documents, pages of description, and the like, from the credit card documentation and ingested product identifiers and text inputs.

In some embodiments, the system described herein may use a vector database that stores vectorized responses that the chatbot can use to respond to queries from a user. For example, the vector database may store a plurality of responses that can be output by the chatbot in vector form. The user may submit a query to the chatbot via a chat window. The query may be converted into vector form and then compared to the vector database by the LLM to identify the vectorized response within the vector database that most closely matches the location of the vector within vector space.

FIG. 1 illustrates a computing environment 100 for a chatbot 114 that discusses payment card data according to example embodiments. Referring to FIG. 1, a host platform 120, such as a cloud platform, web server, etc., may host a mobile application (e.g., a back-end 122) that includes a large language model (LLM) 124 and a data store 126 with wallet data and a data store 128 with credit card documentation. The LLM 124 is a GPT model that can create human-like text and content (such as images, audio, etc.) and conversationally answer questions.

A user may use a user device, 110, to download and install the mobile application (e.g., a front-end 112).

For example, the user device 110 may download the mobile application from an application marketplace and install the application using an operating system of the user device 110. Here, the host platform 120 may host the software application and make it accessible to the user device 110 over a computer network such as the Internet.

In the example embodiments, the LLM 124 may receive conversation content from a chat conversation between the user and the chatbot 114. For example, text content from a chat window of the chatbot 114 may be extracted and submitted to the LLM 124 by the back-end 122. The text content may identify which entity said which comment (e.g., the user or the chatbot, etc.). The text content may also be ordered based on the order in which it is posted to the chat window, thereby enabling the sequence to be used by the LLM 124. As another example, the LLM 124 may receive contextual data from the user device 110, such as global positioning system (GPS) coordinates of the current location of the user device 110, thus providing the user's current location. As another example, the LLM 124 may receive product information such as a serial number, stock-keeping unit (SKU) number, or the like, which may be scanned with an image component on the user device 110 or input to the chat window using text.

The LLM may use the product information to converse with the user about payment cards, which can benefit the user if the user were to use the payment cards to purchase the product (scanned code). For example, one or more of text content from a chat window, contextual content from the user device 110, payment card data from the data store 128, and the like may be input to the LLM 124 when generating responses to be output by the chatbot 114 displayed on the user device 110.

As an example, a user may open the mobile application on the user device 110 while standing in line to checkout at a merchant location. Here, the user may scan a product identifier, such as a QR code, bar code, or the like, found on a package or the product itself.

Here, the user can use an imaging element such as a camera on the user device 110 to capture an image of the code and send it to the host platform 120 over a network.

The scanned code may be a stock-keeping unit (SKU), barcode, quick response (QR) code, or the like, uniquely identifying the product. In response, the LLM 124 may ingest the product data and identify which cards are currently held in a mobile wallet on the user device (e.g., within mobile application 112) from the data store 126 and identify the benefits that are associated with each based on the payment card documents stored in the data store 128. The resulting benefits may be displayed within the chat window on the user device 110. As an example, the benefits may be output by the chatbot within the chat window.

FIG. 2 illustrates a process 200 of executing a model 224 on input content according to example embodiments. As an example, the model 224 may be the LLM 124 described with respect to FIG. 1; however, embodiments are not limited thereto. Referring to FIG. 2, a software application 210 may request execution of the model 224 by submitting a request to the host platform 220. In response, an AI engine 222 may receive the request and trigger the model 224 to execute within a runtime environment of the host platform 220.

In FIG. 2, the AI engine 222 may control access to models stored within the model repository 223. For example, the models may include GenAI models, AI models, machine learning models, LLMs, neural networks, and/or the like. The software application 210 may trigger execution of the model 224 from the model repository 223 via submission of a call to an API 221 (application programming interface) of the AI engine 222. The request may include an identifier of the model 224, such as a unique ID assigned by the host platform 220, a payload of data (e.g., to be input to the model during execution), and the like. The AI engine 222 may retrieve the model 224 from the model repository 223 in response and deploy the model 224 within a live runtime environment. After the model is deployed, the AI engine 222 may execute the running instance of the model 224 on the payload of data and return a result of the execution to the software application 210.

In some embodiments, the data payload may be a format that cannot be input to the model 224 nor read by a computer processor. For example, the data payload may be in text format, image format, audio format, and the like. In response, the AI engine 222 may convert the data payload into a format readable by the model 224, such as a vector or other encoding.

The vector may then be input to the model 224.

In some embodiments, the software application 210 may display a user interface that enables a user thereof to provide feedback from the output provided by the model 224. For example, a user may input an identifier of a product of interest, and the product may output credit card benefits associated with the product of interest.

Here, the user may provide feedback indicating whether the output benefits are correct. According to various embodiments the feedback may be submitted through a chat window with a chatbot according to various embodiments. This information may be added to the results of execution and stored within a log 225.

The log 225 may include an identifier of the input, an identifier of the output, an identifier of the model used, and feedback from the recipient. This information may be used to retrain the model subsequently.

FIG. 3A illustrates a process 300A of training an LLM 322 according to example embodiments. However, it should be appreciated that the process 300A shown in FIG. 3A also applies to other models, such as machine learning, GenAI, AI, and the like. Referring to FIG. 3A, a host platform 320, may host an IDE 310 (integrated development environment) where LLM models, machine learning models, AI models, and the like may be developed and trained. In this example, the IDE 310 may include a software application with a user interface accessible by a user device over a network or through a local connection.

For example, the IDE 310 may be embodied as a web application that can be accessed at a network address, URL, etc., by a device. As another example, the IDE 310 may be locally or remotely installed on a computing device used by a user.

The IDE 310 may be used to design a model (via a user interface of the IDE), such as a large language model (e.g., the LLM 322, etc.) that can converse with a user and is also referred to as a GPT model. The LLM 322 may receive text as input and generate an output response, which can be displayed on a user interface/dashboard of a software application that displays content during meetings between user devices. The LLM 322 can be executed/trained based on the training data established via the user interface. For example, the user interface may be used to build a new model.

The training data for training such a new model may be provided from a training data store such as a database 324, which includes training samples from the web, credit card documents, mappings between product identifiers and credit card benefits, runtime feedback, and the like. As another example, the training data may be pulled from one or more external data stores 330 such as publicly available sites, etc.

The LLM 322 may be executed on training data via an AI engine 321 of the host platform 320 during training. The training data may be queried from the different data stores, vectorized if necessary, and executed by the LLM 322. The LLM 322 may learn mappings/connections between credit card benefits and product identifiers, product types, and the like during the execution and can learn to converse with the user based on the content consumed. When fully trained, the model may be stored within the model repository 323 via the IDE 310 or the like.

As another example, the IDE 310 may retrain the LLM 322 after the model has already been deployed. Here, the training process may use executional results that have already been generated/output by the LLM 322 in a live environment (including any customer feedback, etc.) to retrain the LLM 322. For example, predicted benefits of a payment card generated by the LLM 322 and the user feedback about the predicted benefits (e.g., whether they were correct or not) may be used to retrain the model to enhance further the images generated for all users. The responses may indicate whether the generated content is correct and, if not, what aspects of the images and text are incorrect. This data may be captured and stored within a runtime log 325 or other data store within the live environment and can be subsequently used to retrain the LLM 322.

Figure 3B:
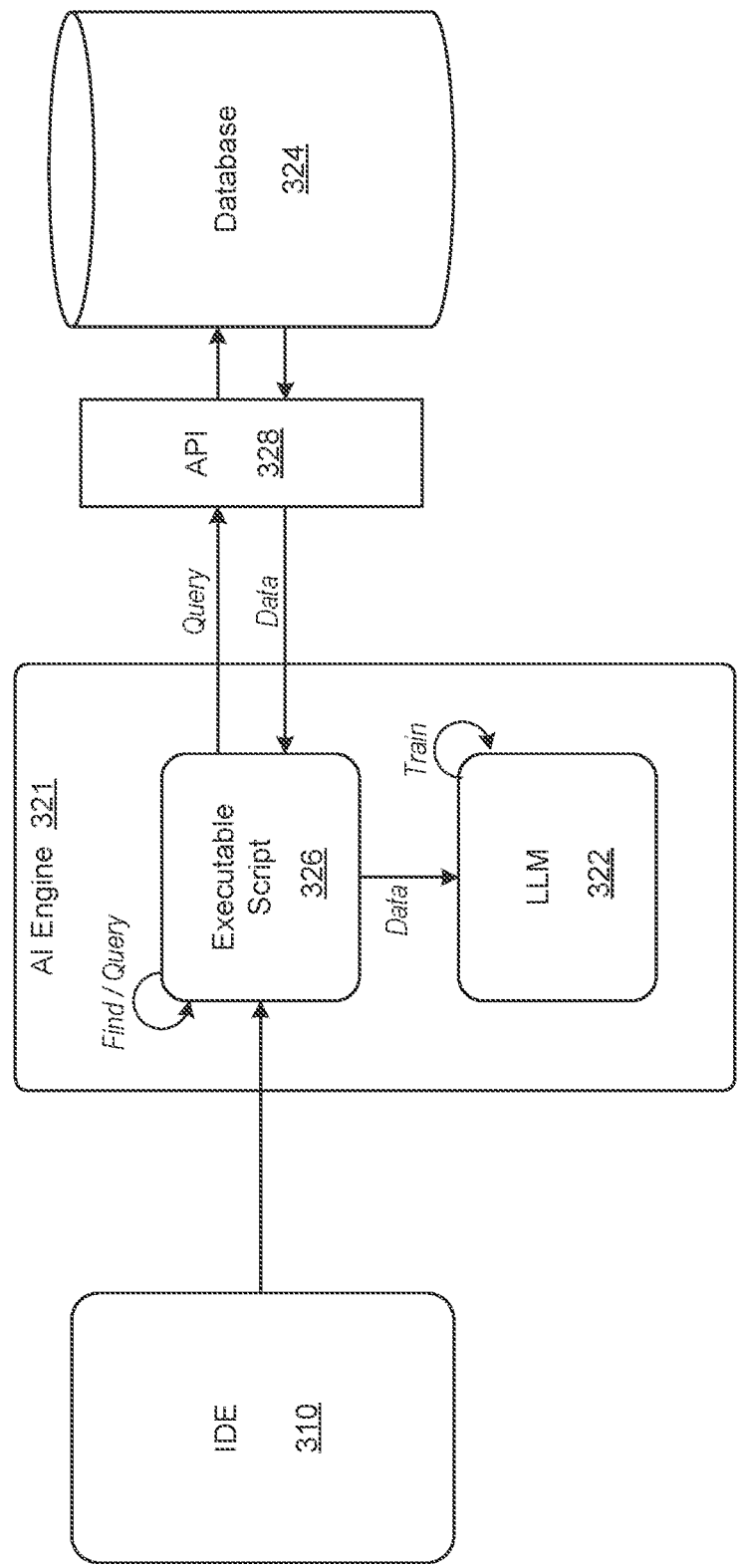

FIG. 3B illustrates a process 300B of executing a training process for training/retraining the LLM 322 via an AI engine 321. In this example, a script 326 (executable) is developed and configured to read data from a database 324 and input the data to the LLM 322 while the LLM is running/executing via the AI engine 321. For example, the script 326 may use identifiers of data locations (e.g., table IDs, row IDs, column IDs, topic IDs, object IDs, etc.) to identify locations of the training data within the database 324 and query an API 328 of the database 324. In response, the database 324 may receive the query, load the requested data, and return it to the AI engine 321, which is input to the LLM 322. The process may be managed via a user interface of the IDE 310, which enables a human-in-the-loop during the training process (supervised learning). However, it should also be appreciated that the system is capable of unsupervised learning.

The script 326 may iteratively retrieve additional training data sets from the database 324 and iteratively input the additional training data sets into the LLM 322 during the execution of the model to continue to train the model.

The script may continue until instructions within the script tell the script to terminate, which may be based on a number of iterations (training loops), total time elapsed during the training process, etc.

Figure 3C:
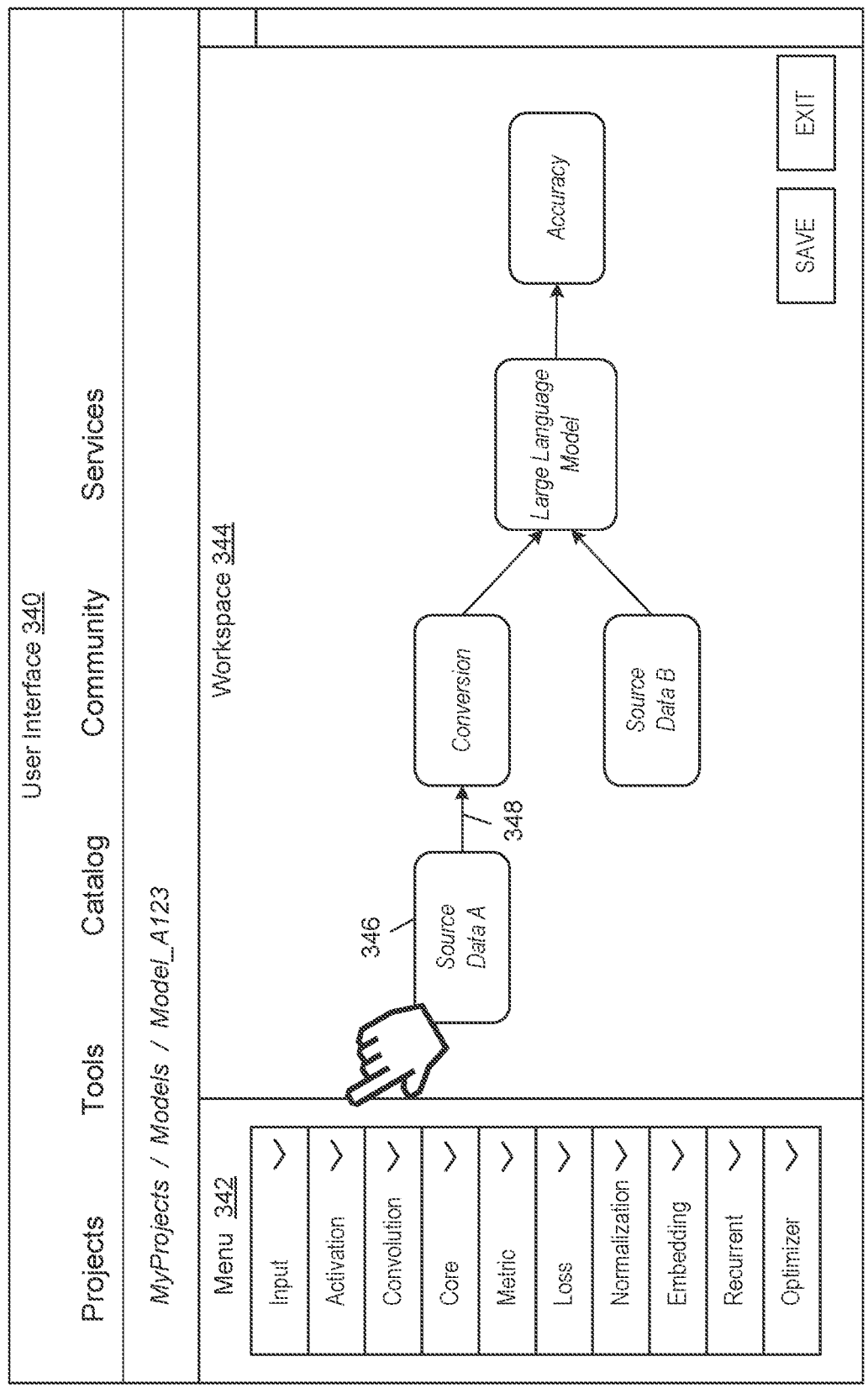

FIG. 3C illustrates a process 300C of designing a new AI model via a user interface 340 according to example embodiments. As an example, the user interface 340 may be output as part of the software application which interacts with the IDE 310 shown in FIG. 3A, however, embodiments are not limited thereto. Referring to FIG. 3C, a user can use an input mechanism to make selections from a menu 342 shown on the left-hand side of the user interface 340 to add pieces to the model such as data components, model components, analysis components, etc., within a workspace 344 of the user interface 340.

In the example of FIG. 3C, the menu 342 includes a plurality of graphical user interface (GUI) menu options, which can be selected to drill down into additional components that can be added to the model design shown in the workspace 344.

Here, the GUI menu options include options for adding features such as neural networks, machine learning models, AI models, data sources, conversion processes (e.g., vectorization, encoding, etc.), analytics, etc. The user can continue to add features to the model and connect them using edges or other means to create a flow within the workspace 344. For example, the user may add a node 346 to a new model diagram within the workspace 344. For example, the user may connect the node 346 to another node in the diagram via an edge 348, creating a dependency within the diagram. When the user is done, the user can save the model for subsequent training/testing.

According to various embodiments, the LLM described herein may be trained based on custom-defined prompts to draw out specific attributes associated with a user's goal. These same prompts may be output during a live execution of the LLM. For example, a user may input a goal description and other attributes.

The LLM can then use the description/attributes to generate a custom image that enables the user to visualize the goal. The prompts may be generated via prompt engineering that can be performed through the model training process, such as the model training process described above in the examples of FIGS. 3A-3C.

Prompt engineering is the process of structing sentences (prompts) so that the GenAI model understands them. A prompt may include a question about a product, a question about a location, a question about a user's intention, a request for a description from the user, and the like.

The prompt may also provide an amount to purchase, a price range, and the like. All of this information may be input to the LLM and used to create chat content that can be output by a chatbot during a chat conversation with a user. Part of the prompting process may include delays/waiting times intentionally included within the script so the model has time to think/understand the input data.

FIG. 4 illustrates a process 400 of generating a chat response based on contextual data and product data according to example embodiments. Referring to FIG. 4, a host application 420 is accessible over a network and provides a chat function to front-end clients such as a user device 410.

In this example, the user device 410 may connect to a host platform that hosts the host application 420, such as a web server, a cloud platform, an on-premises server, or the like. The user device 410 may open the application and view a chat window 411 with a chat function that enables the user to ask questions and a chatbot 412 to provide answers. The responses output by the chatbot 412 within the chat window 411 are generated by an LLM 422 that has a GPT functionality.

During the chat session on the user device 410 with the chatbot 412 of the host application 420, the host application 420 may transfer content from the chat window 411 to the LLM 422 as input. In addition, the host application 420 may also receive contextual data from the user device 410, such as geographic coordinates, GPS coordinates, etc., that can be transferred to the LLM 422 as input.

As another example, contextual data may include calendars, purchases, and the like. The contextual data may be provided to the host application 420 with a hypertext transfer protocol (HTTP) message, an application programming interface (API) call, or the like.

The host application 420 may trigger execution of an LLM 422 on each input from the user to determine a next piece of text content to output via the chatbot, respectively, wherein each execution of the LLM 422 includes a new chat input from the user and a most-recent state of the conversation between the user and the chatbot 412 within the chat window 411. The LLM 422 may transfer the next output/response to the host application 420, which outputs the next output via the chatbot 412 within the chat window 411 on the user device 410.

Each execution of the LLM 422 may include a new conversation state input to the LLM 422 from the chat window 411. For example, the conversation state may include a history of all communications from the current session with the user performed via the chat window 411. Initially, the conversation state may be empty. Each time the user submits a query, the conversation state grows.

Each time the chatbot 412 responds, the conversation state grows. Furthermore, the more the conversation grows, the more accurate the responses may become from the LLM 422 because more data is being input to the LLM 422.

In some embodiments, the LLM 422 may be configured to try to obtain the most information in the shortest number of rounds of communication. Here, the LLM 422 may determine a goal/next goal of the conversation based on execution of the LLM on the new chat input and the most recent state of the conversation between the user and the chatbot. The LLM 422 can generate an additional response to be output by the chatbot based on execution of the LLM 422 on the next goal of the conversation.

Figure 5B:
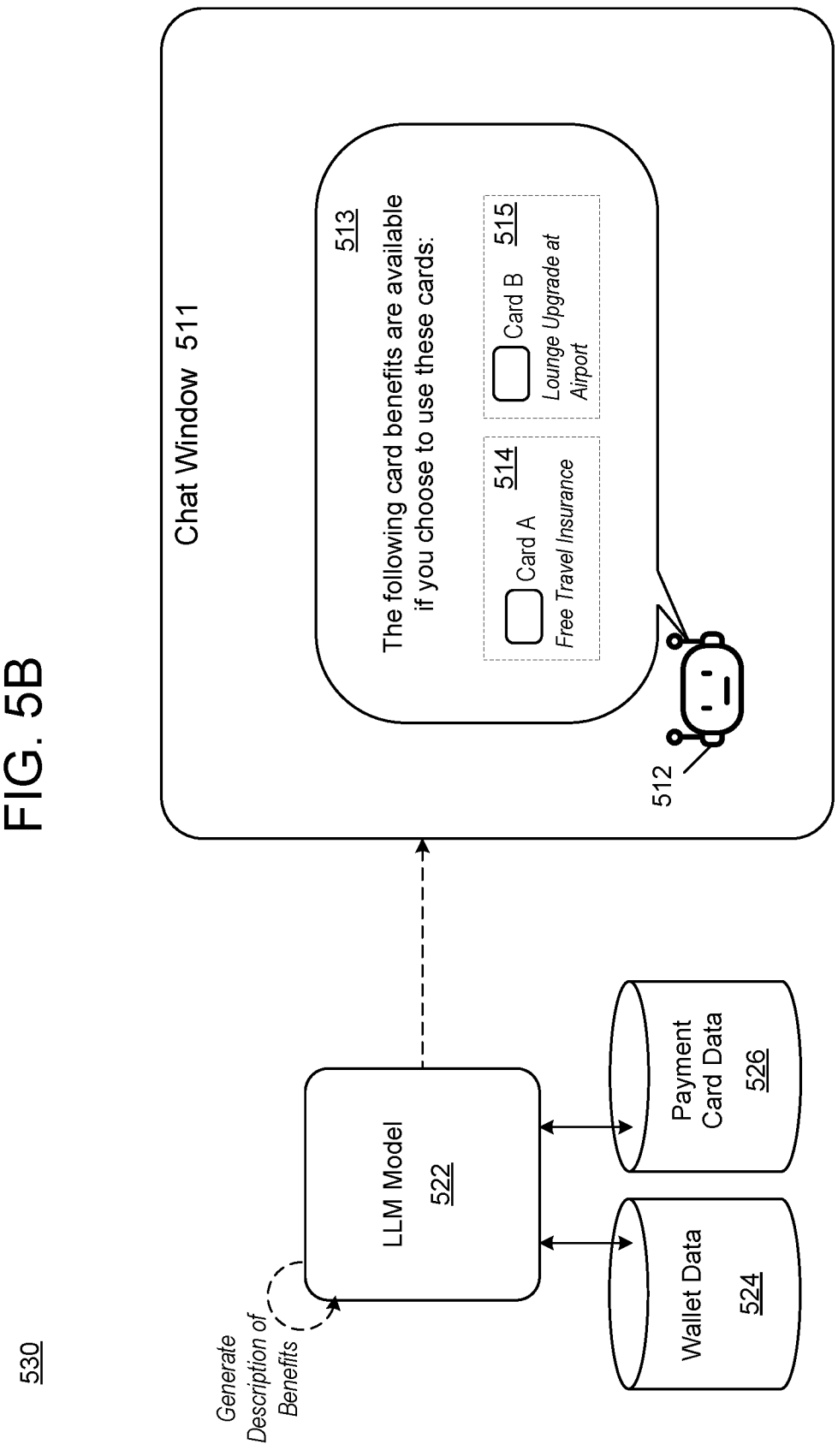

FIGS. 5A-5B illustrate a process of a chatbot performing a proactive benefit scan based on contextual data according to example embodiments. For example, FIG. 5A illustrates a process 500 of a user device 510 scanning a product code 502 and sending it to a host platform 520 of a host application. The product code 502 may be attached to a package or the outside of the product itself and may be scanned using an imaging element, such as a camera, on the user device 510. The user may hold the camera in front of the product code 502 and tap on a pop-up notification to capture the scan. In response, the camera captures the image, and the user device 510 determines the product code 502 and sends it to the host platform 520.

Here, the host platform 520 may host an LLM 522 capable of conversing with the user device 510 based on the scanned product identifier. The host platform 520 also includes a data store with wallet data of a mobile wallet installed on the user device 510 and the payment cards stored within the mobile wallet. The mobile wallet may be a digital wallet in which the payment card information is "digitized" into the mobile device through a digitization process. The host platform 520 may also include a data store 528 of payment card documentation, which includes user manuals, guides. FAQs, tutorials, and the like, containing the payment card's benefit information.

In response to receiving the product code 502, the LLM 522 may generate a description of benefits that the user will obtain by using the payment cards in their wallet. Here, the LLM 522 may determine which benefits are offered by which cards with respect to the purchase of the product before the product is purchased. The benefits may be extracted from the documentation stored within the data store 528 and used to generate a text-based description that can be output by a chatbot during a chat session on the user device 510, as shown in the example of FIG. 5B.

FIG. 5B illustrates a process 530 of the LLM 522 of the host platform 520, generating a description of benefits based on the product code 502, the ingested wallet data 524 from the data store, and the ingested payment card data 526 from the data store. In this example, the LLM 522 may generate a text-based description that includes text content that describes the benefits available to the user by using the different cards in their wallet. If a card does not provide a benefit, the system may leave it out or exclude it from the description generated and output by the system. In the example of FIG. 5B, the LLM 522 generates a message 513 with a description of benefits available for using a first payment card 514 and a description of benefits available for using a second payment card 515. The message 513 may be a chat message that is output by a chatbot 512 within a chat window 511 of the host application on the user device 510.

In this example, the LLM 522 may understand a correlation between product identifiers, such as SKU numbers, serial numbers, etc., and payment card benefits, such as points gained, free travel insurance, free delivery, discounts on rental cars, discounts on airports, etc. This information may be learned through a training process in which the LLM 522 ingests a large corpus of payment card documentation, including manuals, FAQs, and the like, with respect to different types of credit cards, debit cards, etc. The LLM 522 may also be trained to map product identifiers to credit card benefits based on predefined mappings of benefits to product identifiers.

In one embodiment, the user selects a product on their device 510. The identifier of this product is then communicated to the processor. The processor requests details of the stored payment cards from the digital wallet system, which then provides a list of all the cards. To understand the benefits a user would receive from using each card to purchase the selected product, the processor communicates with the LLM 522, providing the product identifier and requesting an analysis based on the credit card documents. Responsive to determining the benefits, the processor instructs the chat window 511 on the user's device to display these benefits 514 and 515 The chat window confirms the successful presentation of the information.

In one embodiment, when a user selects a product, its SKU 502 is sent from the user's device to the processor. Instead of a generic product identifier, the processor now communicates with the LLM 522 using the specific SKU, allowing for a more precise benefit determination based on the exact product variant or version. After the benefits associated with the SKU are determined, the processor sends them to be displayed in the chat window 511 on the user's device 510.

In one embodiment, the instant solution integrates an additional feature wherein, after determining benefits associated with a product, it generates a user prompt based on the LLM's 522 execution on the product's identifier 502. This could be for additional user inputs, confirmations, or providing more insights. For example, the user has selected a product with the Identifier [XYZ]. A list of payment cards stored in the digital wallet 524 is displayed to the user. Using the LLM, executed on product [XYZ] and the corpus of payment card data 526 are examined to determine benefits for each listed payment card. A prompt is sent to the user device 510, "Would you like recommendations for similar products?" The LLM takes the product identifier and analyzes it to come up with a relevant prompt that might be useful or insightful for the user. Following the generation of the prompt, the processor instructs the chatbot within the chat window 511 on the user's device to display the generated prompt to the user.

Figure 6A:
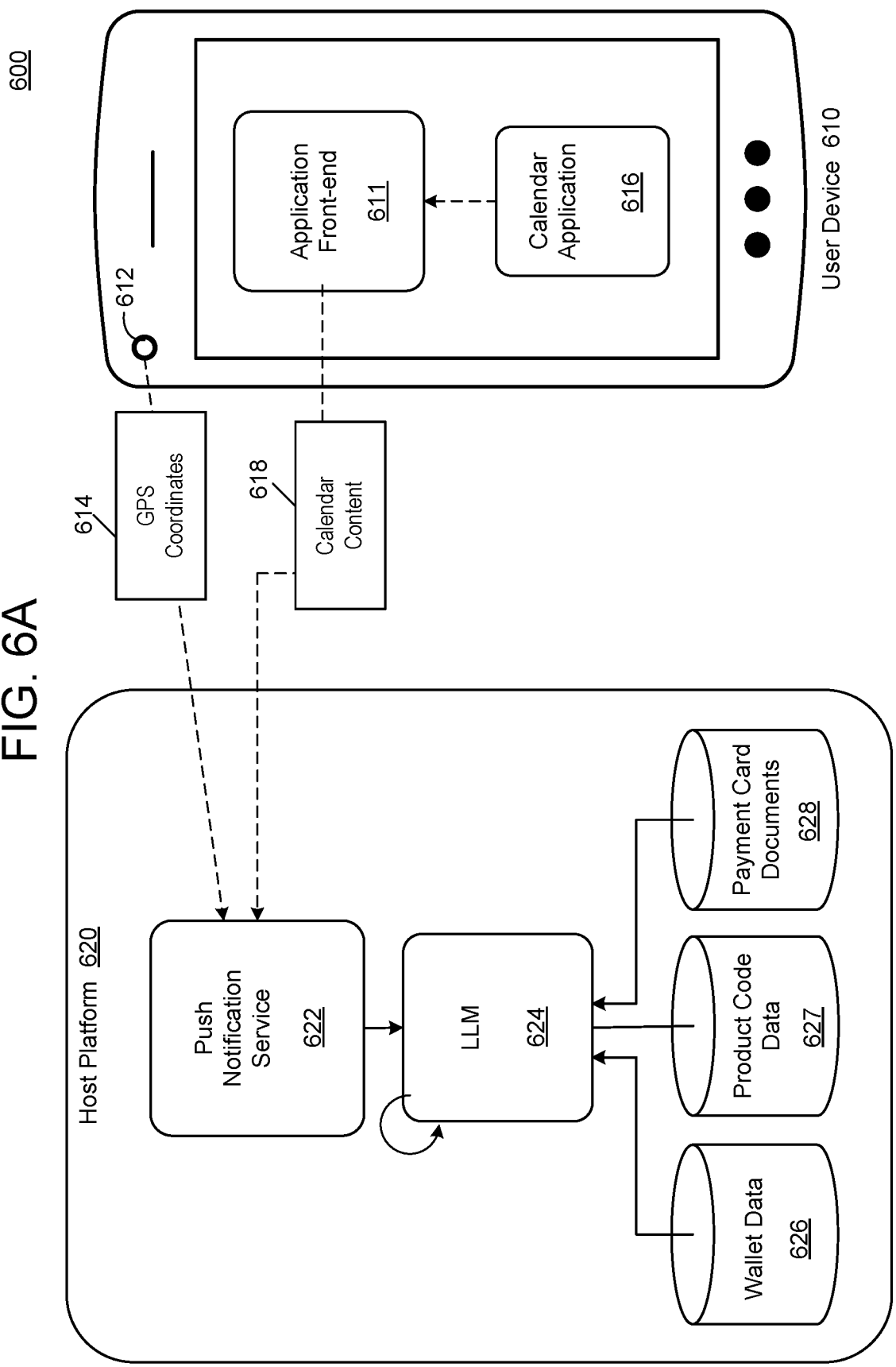
FIGS. 6A-6B are diagrams illustrating a process of delivering an in-app notification to a mobile device through a chatbot according to example embodiments.
Figure 6B:
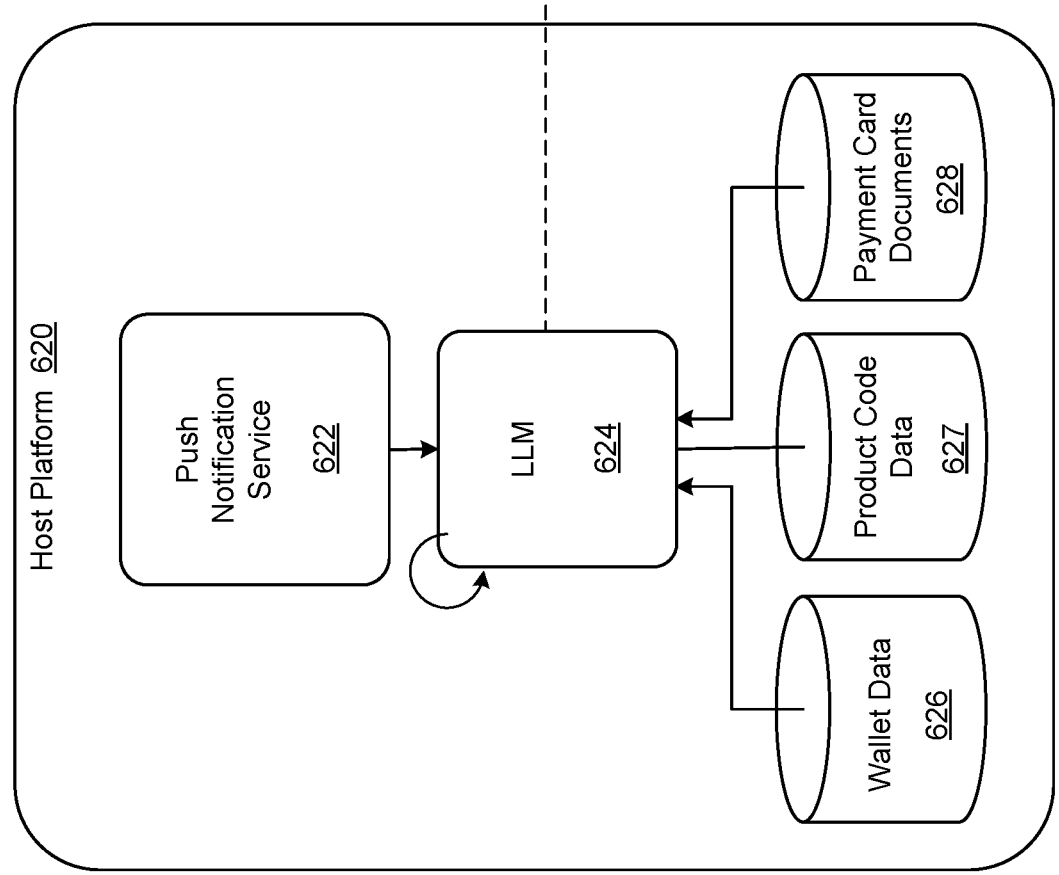

FIGS. 6A-6B illustrate a process of delivering an in-app notification to a mobile device through a chatbot according to example embodiments. For example, FIG. 6A illustrates a computing environment 600 with a host platform 620 in communication with a user device 610. For example, the host platform 620 may host a software application with a push communication service 622. The software application may also include a front-end 611 installed on the user device 610. In this example, the push notification service 622 may iteratively receive contextual data from the front-end 611 of the application. The contextual data may include geographic coordinates 614, captured by a sensor 612 on the device, such as a GPS sensor. As another example, the contextual data may include calendar content 618 extracted from a calendar application 616 on the user device 610. Here, the front-end 611 may identify upcoming events, such as travel events, which may involve purchases such as supplies, travel tickets, lodging, food, etc.

The push notification service 622 may receive the contextual data from the user device 610 and transfer it to an LLM 624, which ingests the contextual data and wallet data of the user device 610 from a data store 626. Here, the wallet data may identify which payment cards a mobile wallet holds on the user's device 610. The LLM 624 may also ingest merchant data, such as product codes, geographic location data of the merchants, and the like, from a data store 627. The LLM 624 may also ingest payment card documentation from a data store 628. Here, the LLM 624 may determine that based on the geographic location, the user is near a location that offers a special on products of interest to the user. The LLM 624 may be trained to map a product identifier to a credit card/payment card benefit stored in a document.

As an example, a user of the user device 610 may be sitting at home. Periodically, the push notification service 622 may query the front-end 611 for contextual data. In response, the front-end 611 provides the current context from the user device 610 to the push notification service 622, such as calendar content, GPS coordinates, etc., the LLM 624 may identify that the user is about to travel to a colder climate with mountainous terrain based on the contextual data. In this example, the LLM 624 may identify a payment card in the user's wallet that offers benefits for purchasing outdoor equipment at a particular retailer. Here, the LLM 624 can identify a closest location of the retailer to the user from the contextual data and transmit an in-app message/communication to the front-end 611 of the application on the user device 610.

The in-app communication may include a description of a benefit or some other kind of notification that informs the user of something of interest. For example, FIG. 6B illustrates a process 630 of outputting an in-app notification 632 on a user interface of the user device 610. In this example, the LLM 624 transmits the in-app communication to the user device and causes a window with the notification 632 to be displayed at a predetermined pixel location on the user device 610, such as a center of the user interface/screen. Meanwhile, the communication may also trigger a remainder 613 of the user interface to be darkened or otherwise muted to focus the user's attention on the notification content within the notification 632.

Here, the notification 632 includes information about a sale offered for cardholders of a particular type of payment card available at a particular merchant location (Jewelry Store B).

In one embodiment, the user device 610 communicates with its processor, requesting the current geographic location. The sensor on the device responds with the precise coordinates. Using this location, the processor then inquires with either a local database or an external service about any objects, products, or services available at that location. The database or service provides a list of such objects. To determine the benefits associated with each identified object, the processor executes a large language model (LLM) 624 using both the object identifiers and a stored database of payment card data 628. The LLM then communicates back the associated benefits for each object. The processor sends a message to the user device, prompting it to display these benefits in a chat window. The device confirms the successful display of this notification 632 to the processor.

In one embodiment, once the processor identifies the user device's 610 current location, it also sends a request to scan the calendar application on the user device for any future entries containing geographic locations 614. The user device provides access and relays back to the processor the details of entries with their associated geographic locations. This future geographic location information can then be used by the processor to identify objects, products, or services available at that future location.

In one embodiment, after the processor identifies the geographic location 614 of the user device 610, it sends an additional request to the user device to access and retrieve the user's preferences from a specified mobile application. The user device provides the required access, and the processor then receives the user's preferences. Given these preferences, the processor now searches for items of interest within the geographic location. This means that instead of randomly identifying objects or services, the processor identifies specific items that align with the user's preferences. For instance, if a user's preference indicates a penchant for "vintage clothing," the processor might identify a vintage clothing shop in the geographic location.

After the processor identifies an item of interest based on user preferences, the process dives deeper into determining benefits for multiple payment cards. The processor requests the user device 610 to provide data for all available payment cards. In one embodiment, the processor communicates with the LLM system 624, requesting it to analyze the benefits of purchasing the identified item of interest using each of the provided payment cards. The LLM then computes the potential benefits, bonuses, discounts, or rewards that would be associated with each card based on the item's identifier and the database of payment card data 628. The processor then instructs the user device to display a comprehensive message within the chat window. This message enumerates the potential benefits of purchasing the item of interest using each of the available payment cards. The user is thus presented with a comparative view, enabling them to make a more informed decision about which card to use for optimal benefits.

Upon determining the benefits for each payment card, the processor communicates its intent to send separate chat messages for each card's benefits to the user device 610. The user device responds, indicating its readiness. For each payment card, the processor sends a separate chat message to the user device, instructing it to display the associated benefits. These messages may be sent simultaneously, ensuring that the user sees a series of chat messages pop up in rapid succession, each highlighting the benefits of purchasing the item of interest with a particular payment card.

In one embodiment, the processor communicates with the user device, querying it for a list of payment cards present in the mobile wallet. The user device responds with a list of cards currently stored in the wallet. Upon identifying the payment cards, the processor requests the database for the documents that are linked or mapped to these specific cards. The database returns these associated documents to the processor. The processor then engages the LLM 624, providing it with both the identifiers of the potential purchase objects and the documents mapped to the identified payment cards. The LLM processes this data and returns a breakdown of the benefits for each payment card in relation to the potential purchases.

In one embodiment, with the in-app chatbot activated, the processor sends the relevant chat message detailing the determined benefits for the user's potential purchases. The chatbot, functioning within the mobile application, ensures the user receives this message seamlessly while operating the app. The chatbot then confirms the successful transmission of the message back to the processor.

In one embodiment, the processor communicates with the geolocation system of the device to identify locations within a predetermined vicinity of the user's current location. The system then returns the number and details of these locations. Post identification of partner locations, the processor interacts with a recommendation system or database to fetch relevant suggestions or benefits associated with these locations. The processor commands the chat window on the user's device to show the gathered recommendations. The chat window then confirms the successful display of this information.

The LLM 624 may receive updated benefit information from merchants, which can be stored within the data store 627. The updated benefit information may include new cards, new features added to existing cards, removal of existing cards, and the like. Thus, the LLM 624 can have a current state of the payment cards available to the users and the benefits each offers.

FIG. 7A illustrates a method 700 of executing a proactive benefit scan through a chatbot according to example embodiments. As an example, the method 700 may be performed by a computing system, a software application, a server, a cloud platform, a combination of systems, and the like. Referring to FIG. 7A, in 701, the method may include receiving an identifier of a product from a digital wallet on a user device. In 702, the method may include identifying one or more payment cards stored within the digital wallet on the user's device. In 703, the method may include determining benefits that will be obtained by using each of the one or more payment cards to purchase the product via execution of an LLM on the product's identifier and a corpus of credit card documents.

In 704, the method may include displaying a chat message within a chat window on the user's device with a description of the determined benefits that will be obtained.

In some embodiments, the receiving may include receiving a stock keeping unit (SKU) number from the digital wallet on the user device and determining the benefits that will be obtained by using each of the one or more payment cards based on execution of the LLM on the SKU. In some embodiments, the method may further include generating a prompt based on execution of the LLM on the identifier of the product and outputting the prompt via a chatbot within the chat window. In some embodiments, the method may further include receiving a response to the prompt and generating the chat message within the chat window based on execution of the LLM on the prompt and the response to the prompt.

In some embodiments, the method may further include identifying a plurality of payment cards within the digital wallet and determining the benefits that will be obtained by each of the plurality of payment cards based on execution of the LLM on the identifier of the product and the corpus of credit card documents. In some embodiments, the method may further include ranking the plurality of payment cards based on execution of the LLM on the identifier of the product and the corpus of credit card documents and displaying rankings of the plurality of payment cards within the chat window.

In some embodiments, the method may include detecting that the product has been purchased via the digital wallet and, in response, executing the LLM on the product's identifier and the corpus of credit card documents. In some embodiments, the method may further include identifying a plurality of payment cards stored within a digital wallet on the user device, determining that a payment card from among the plurality of payment cards does not offer a benefit, and excluding a description of the determined payment card from the description of the benefits output via the chat window.

Figure 7B:
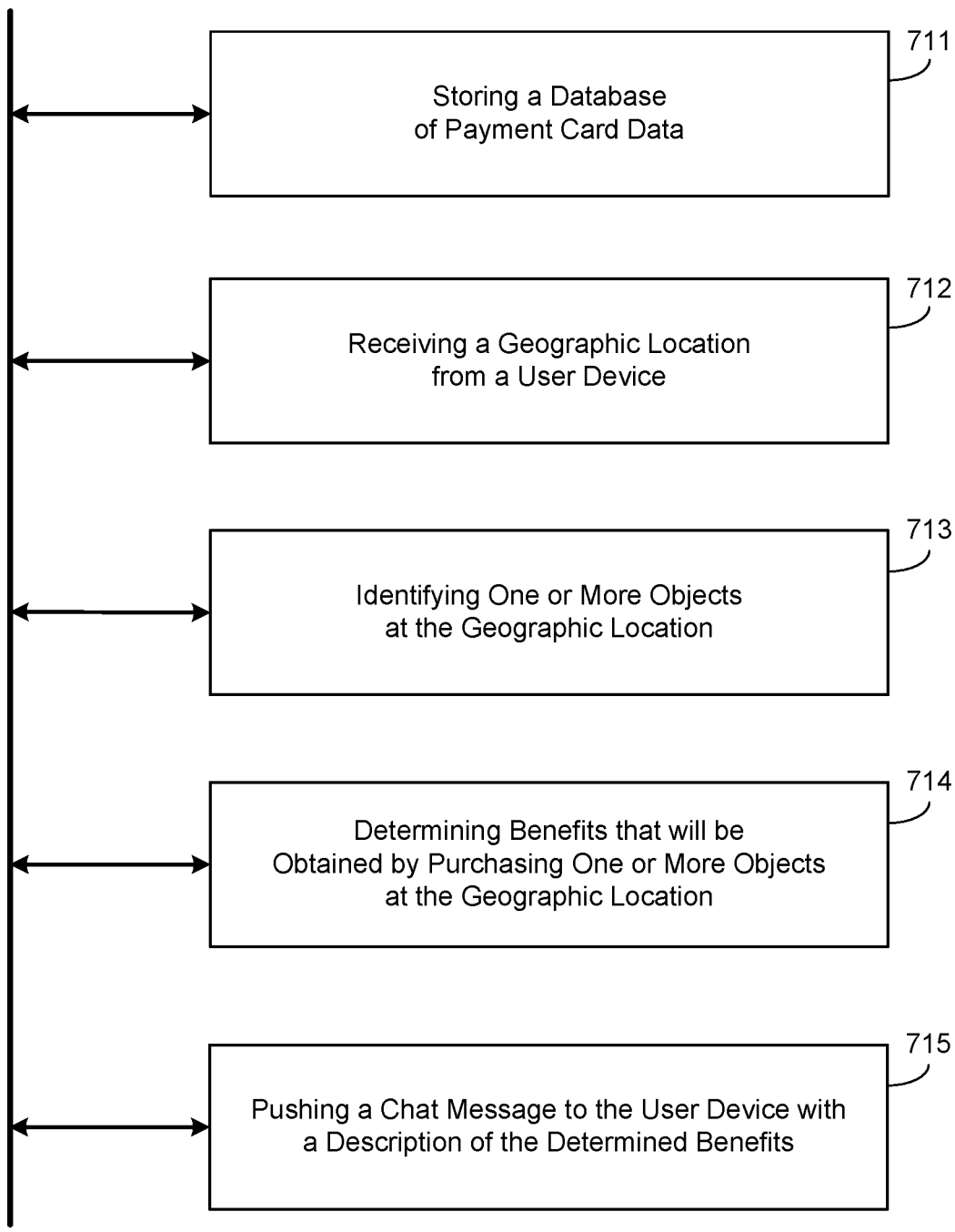
FIG. 7B is a diagram illustrating a method of pushing notifications to a user device with a chatbot according to example embodiments.

FIG. 7B illustrates a method 710 of pushing notifications to a user device with a chatbot according to example embodiments. As an example, the method 710 may be performed by a computing system, a software application, a server, a cloud platform, a combination of systems, and the like. Referring to FIG. 7B, in 711, the method may include storing a database of payment card data. In 712, the method may include receiving an identifier of a product from a digital wallet on a user's device. In 713, the method may include identifying one or more payment cards stored within the digital wallet on the user's device. In 714, the method may include determining the benefits that will be obtained by using each of the one or more payment cards to purchase the product via execution of an LLM on the product's identifier and the database of payment card data. In 715, the method may include displaying a chat message within a chat window on the user's device with a description of the determined benefits that will be obtained.

In some embodiments, the receiving may include scanning a calendar application on the user device and identifying the geographic location from an entry stored at a future point in time within a calendar of the calendar application on the user device.

In some embodiments, the identifying may include identifying an item of interest offered by a merchant at the geographic location based on preferences of the user, which are stored in a mobile application on the user's device. In some embodiments, the determining may include determining benefits that will be obtained by purchasing the item of interest using each of two or more payment cards based on execution of the LLM on an identifier of the item of interest and credit card documentation associated with the two or more payment cards.

In some embodiments, the displaying may include simultaneously pushing chat messages about the benefits that will be obtained by purchasing the item of interest using each of two or more payment cards via the chat window on the user's device. In some embodiments, the identifying may include identifying one or more payment cards that are currently held within a mobile wallet on the user device based on and determining benefits that will be obtained by purchasing the object via execution of a large language model (LLM) on documents mapped to the one or more payment cards within the database of payment card data. In some embodiments, the displaying may include outputting the chat message via an in-app chatbot within a mobile application installed on the user's device. In some embodiments, the method may further include detecting a partner location within a predetermined distance of the geographic location of the user device and displaying a recommendation associated with the partner location within the chat window on the user device.

The above embodiments may be implemented in hardware, a computer program executed by a processor, firmware, or a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from and write information to the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture, which may represent or be integrated into any of the above-described components, etc.

FIG. 8 illustrates an example system 800 that supports one or more example embodiments described and/or depicted herein. The system 800 comprises a computer system/server 802, operational with numerous other general or special purpose computing system environments or configurations. Examples of well-known computing systems, environments, and/or configurations that may be suitable for use with computer system/server 802 include but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in local and remote computer system storage media, including memory storage devices.

As shown in FIG. 8, computer system/server 802 in the example system 800, is a general-purpose computing device. The components of computer system/server 802 may include, but are not limited to, one or more processors or processing units (processor 804), a system memory 806, and a bus that couples various system components, including the system memory 806 to the processor 804.

The bus represents one or more of several types of bus structures, including a memory bus or memory controller, a peripheral bus, an accelerated graphics port, and a processor or local bus using various bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes various computer system readable media. Such media may be any available media that is accessible by computer system/server 802, and it includes both volatile and non-volatile media, removable and non-removable media. The system memory 806, in one embodiment, implements the flow diagrams of the other figures. The system memory 806 can include computer system readable media in volatile memory, such as random-access memory (RAM) 810 and/or cache memory 812. Computer system/server 802 may further include other removable/non-removable, volatile/non-volatile computer system storage media. By way of example, only storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the system memory 806 may include at least one program product with a set (e.g., at least one) of program modules configured to carry out the functions of various embodiments of the application.

Program/utility 816, having a set (at least one) of program modules 818, may be stored in the system memory 806 by way of example, and not limitation, as well as an operating system, one or more application programs, other program modules, and program data. Each of the operating systems, one or more application programs, other program modules, and program data or some combination thereof may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks, such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples include but are not limited to, microcode, device drivers, redundant processing units, external disk drive arrays, RAID systems, tape drives, and data archival storage systems etc.

In one embodiment, the instant solution's large language model is integrated with a shopping aggregator platform, which is able to assist the user in identifying the best offer when there are numerous offers at the same time, such as during traditionally busy shopping periods like Black Friday and Cyber Monday, which could be potentially overwhelming for the user to know where to look for the best deals. For example, the user wants to purchase a specific model of television during Black Friday and Cyber Monday. The instant solution uses a large language model that evaluates all real-time sales on e-commerce websites, and along with the user's digital wallet of charge cards, the solution narrows down the multitude of deals down to the best charge card offers for the television the user wants to purchase. When the user interacts with the options that have been presented, the chatbot might further mention that when making the purchase with a certain charge card, the user can receive additional discounts on a premium subscription to a television streaming service. The chatbot might also ask if the user wishes to compare this offer to similar offers from the other cards in their digital wallet. The chatbot might also present discounts when products are bundled together, such as a television and a sound bar. This type of curated shopping experience ensures the user gets the most out of their charge card benefits and helps them to save valuable time when shopping. In another example, the instant solution is aware of the user's browsing history and identifies the products that the user is considering purchasing. This insight adds another level of curated shopping in assisting the user to identify the best offers. For example, the instant solution detects the user has been researching a specific brand of digital camera. During Black Friday and Cyber Monday deals, the chatbot identifies flash deals for the desired digital camera brand, narrows down the camera options based on favorable consumer reviews, and presents the curated list of time-sensitive flash deals to the user. This level of intuition and real-time guidance by the instant solution creates a satisfying customer experience, especially when the deals are time critical due to their limited quantities.

In one embodiment, the instant solution's large language model is integrated with an augmented reality (AR) shopping platform. For example, the user is shopping while wearing their AR eyewear, and when the user gazes at or selects a product, the chatbot automatically activates. Using the identified product as input, it begins to gather relevant card benefit data and documentation in real-time that is applicable to the product. As the user is contemplating the purchase, the chatbot proactively recommends the best charge card from their digital wallet for this purchase, describing not only the immediate cashback or points benefits but also long-term benefits such as extended warranties or loyalty program advantages. In another example, the instant solution might notice the user has been considering a specific product for a duration of time (exceeding a predetermined threshold) and has not committed to the purchase yet. The intuitive chatbot senses that the deal is not enticing enough because the user is hesitant to proceed with the purchase, so the chatbot dynamically searches for a better deal at other stores and e-commerce sites. When it finds a nearby store with a lower price on the product, it informs the user about the better deal and displays directions to the store via the AR eyewear. In these embodiments, the convergence of AR technology with an intuitive chatbot and large language model transforms shopping into an informed and immersive real-time experience.

In one embodiment, the instant solution's large language model is integrated with an augmented reality (AR) shopping experience. For example, as the user walks through a shop while wearing their smart glasses, AR eyewear, or similar AR devices, the chatbot displays information about the products and the current offerings, special discounts, or reward points through the user's AR device. By combining the large language model of charge card data and product data, along with the user's AR environment and real-time location, the chatbot might notice the user's eyes are gazing at one product longer than the other nearby products. Or the chatbot might determine that there is a product in the shop that matches the user's historical shopping preferences. The chatbot displays an AR overlay of the offerings related to the identified product of interest and the charge card benefits. In addition, the chatbot may suggest complementary products, and the user might discover new products they were unaware of, thus enhancing their AR shopping experience and increasing their satisfaction. In another example, when a nearby shop or product in proximity to the user's device has a discount that aligns with the user's charge card benefits, the chatbot alerts the user via the user's AR device, visually highlighting with virtual badges or markers to indicate that there are special deals being offered. If the user inquires, the chatbot describes the offers.

In one embodiment, the instant solution's large language model is integrated with social media platforms to identify offerings for products that the user has shown an interest through their social media activity, such as liking a product or viewing the product's social media posts. For example, a user has shown an interest in a mountain bike and has been viewing posts about this product. When a user is in proximity to a sporting goods shop that sells this product, the chatbot informs the user that it noticed the user's interest in mountain biking and that there is currently an exclusive offer at the nearby sporting goods shop when a purchase is made using the charge card. In addition, the chatbot also mentions to the user that the charge card offers travel insurance to cover adventure sports, such as biking trips.

In one embodiment, the instant solution is integrated with smart home appliances. For example, a user's smart refrigerator (a connected internet of things (IoT) device) detects when certain foods need to be replenished and maintains a shopping list. As the user is walking or driving, the instant solution detects the proximity to a nearby grocery store and identifies the offers and promotions related to the user's charge card and the real-time shopping list maintained by the smart refrigerator. The chatbot then vocally informs the user that the milk carton is almost empty, and that the grocery store located three blocks away has an offer for organic milk, and by purchasing with the card, the user can get a buy-one-get-one-free offer. To further assist the user, the chatbot prompts the user if they would prefer a reminder to purchase the milk later on their way home. This seamless integration offers the user timely benefits and cost savings.

In one embodiment, Generative AI (GenAI) is used to transform data. The process of GenAI may begin with the preprocessing of input data or raw data. The preprocessing process may be comprised of normalization, outlier detection, anonymization, and the handling of missing values to ensure data integrity and consistency. When the input data is structured, GenAI facilitates data augmentation. Data input related to financial institutions may be imbalanced or lack a variance required for robust analysis. Data augmentation may include the generation of synthetic transactions or modeling hypothetical market scenarios to bolster the dataset's diversity and volume. Techniques that may be utilized may include bootstrapping or synthetic minority over-sampling, which address data imbalances, especially in areas like fraud detection, where certain event classes are sparse.

In the instant solution, the use of software tools, such as Generative Adversarial Networks (GANs) and Variational Autoencoders (VAEs), which are trained on input datasets to produce entirely new yet coherent data points. For example, these or similar tools may be employed to generate synthetic customer profiles for testing new financial products, simulate financial markets under various conditions, or even model the potential impact of unforeseen economic events.

Post-generation, the synthetic data's quality is evaluated. This evaluation may involve comparing the synthetic data with historical real-world data, running statistical tests to ensure distributions match, and/or the use of discriminator components of GANs as a litmus test for data realism.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture. They may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of a data network, the Internet, a voice network, an Internet Protocol network, a wireless device, a wired device, and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules to more particularly emphasize their implementation independence. For example, a module may be implemented as a hardware circuit comprising custom, very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, etc.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations, which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several code segments, among different programs, and across several memory devices. Similarly, operational data may be identified and illustrated within modules, embodied in any suitable form, and organized within any suitable type of data structure. The operational data may be collected as a single data set or distributed over different locations, including over different storage devices, and may exist, at least partially, merely as electronic signals on a system or network.

It will be readily understood that the application components, as generally described and illustrated in the figures herein, may be arranged and designed in a wide variety of configurations. Thus, the detailed description of the embodiments is not intended to limit the scope of the application as claimed but is merely representative of selected embodiments of the application.

One with ordinary skill in the art will readily understand that the above may be practiced with steps in a different order and/or hardware elements in configurations that are different from those disclosed. Therefore, although the application has been described based on these preferred embodiments, certain modifications, variations, and alternative constructions would be apparent to those of skill in the art.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:
    a memory; and
    a processor configured to:
        train an artificial intelligence (AI) model using a neural network capability with object identifiers mapped to document content within digital documents,
        receive global positioning system (GPS) coordinates of a current geographic location of a source device from a software application on the source device,
        identify objects located at the current geographic location of the source device,
        identify one or more cards stored within the software application on the source device,
        retrieve the digital documents associated with the one or more identified cards from a database,
        execute the trained AI model on the identified objects and the retrieved digital documents to identify the document content related to the identified objects, where the AI model identifies the document content based on a software library of the AI model,
        extract the identified document content and generate message content that includes the identified document content, and
        display a chat message with a description of the extracted document content within a chat window on the software application on the source device.

2. The apparatus of claim 1, wherein the processor is configured to receive feedback about the description of the extracted document content from the source device, generate a feedback record including the description of the extracted document content and the received feedback, and train the AI model based on the generated feedback record.

3. The apparatus of claim 1, wherein the processor is configured to receive a query via the chat window, convert the query into a vector, identify a response that matches the converted query based on a comparison of the vector and a response that has been vectorized, and display the response via the chat window.

4. The apparatus of claim 1, wherein the processor is configured to simultaneously push two or more chat messages with the description of the extracted document content to the chat window on the source device.

5. The apparatus of claim 1, wherein the AI model comprises a large language model (LLM) which is trained on the retrieved digital documents mapped to the one or more identified cards.

6. The apparatus of claim 1, wherein the processor is configured to output the chat message as an in-app message within a mobile application installed on the source device.

7. The apparatus of claim 1, wherein the processor is configured to detect a location associated with a host of the software application within a predetermined distance of the current geographic location of the user device and display a content associated with the detected location within the chat window on the source device.

8. A method comprising:
    training an artificial intelligence (AI) model using a neural network capability with object identifiers mapped to document content within digital documents;
    receiving global positioning system (GPS) coordinates of a current geographic location of a source device from a software application on the source device;

identifying one or more cards stored within the software application on the source device;

retrieving the digital documents associated with the one or more identified cards from a database;

identifying objects located at the current geographic location of the source device;

executing the trained AI model on the identified objects and the retrieved digital documents to identify the document content related to the identified objects, where the AI model identifies the document content based on a software library of the AI model;

extracting the identified document content and generate message content that includes the identified document content; and displaying a chat message with a description of the extracted document content within a chat window on the software application on the source device.

9. The method of claim 8, wherein the method further comprises receiving feedback about the description of the extracted document content from the source device, generating a feedback record including the description of the extracted document content and the received feedback, and training the AI model based on the generated feedback record.

10. The method of claim 8, wherein the method further comprises receiving a query via the chat window, converting the query into a vector, identifying a response that matches the converted query based on a comparison of the vector and a response that has been vectorized, and displaying the response via the chat window.

11. The method of claim 8, wherein the displaying comprises simultaneously displaying two or more chat messages with the description of the extracted document content to the chat window on the source device.

12. The method of claim 8, wherein the AI model comprises a large language model (LLM) which is trained on the retrieved digital documents mapped to the one or more identified cards.

13. The method of claim 8, wherein the displaying comprises outputting the chat message as in-app message within a mobile application installed on the user source device.

14. The method of claim 8, wherein the method further comprises detecting a location associated with a host of the software application within a predetermined distance of the current geographic location of the user device and displaying a content associated with the detected location within the chat window on the source device.

15. A non-transitory computer-readable storage medium comprising instructions stored therein which when executed by a processor cause a computer to perform:

training an artificial intelligence (AI) model using a neural network capability with object identifiers mapped to document content within digital documents;

receiving global positioning system (GPS) coordinates of a current geographic location of a source device from a software application on the source device;

identifying one or more cards stored within the software application on the source device;

retrieving the digital documents associated with the one or more identified cards from a database;

identifying objects located at the current geographic location of the source device;

executing the trained AI model on the identified objects and the retrieved digital documents to identify the document content related to the identified objects, where the AI model identifies the document content based on a software library of the AI model;

extracting the identified document content and generate message content that includes the identified document content; and displaying a chat message with a description of the extracted document content within a chat window on the software application on the source device.

16. The non-transitory computer-readable storage medium of claim 15, wherein the processor is further configured to perform receiving feedback about the description of the extracted document content from the source device, generating a feedback record including the description of the extracted document content and the received feedback, and training the AI model based on the generated feedback record.

17. The non-transitory computer-readable storage medium of claim 15, wherein the processor is further configured to perform receiving a query via the chat window, converting the query into a vector, identifying a response that matches the converted query based on a comparison of the vector and a response that has been vectorized, and displaying the response via the chat window.

* * * * *